US011599624B2

(12) United States Patent
Sandstrom

(10) Patent No.: US 11,599,624 B2
(45) Date of Patent: *Mar. 7, 2023

(54) GRAPHIC PATTERN-BASED PASSCODE GENERATION AND AUTHENTICATION

(71) Applicant: ThroughPuter, Inc., Williamsburg, VA (US)

(72) Inventor: Mark Henrik Sandstrom, Alexandria, VA (US)

(73) Assignee: ThroughPuter, Inc., Williamsburg, VA (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/894,177

(22) Filed: Jun. 5, 2020

(65) Prior Publication Data

US 2020/0387594 A1    Dec. 10, 2020

Related U.S. Application Data

(60) Provisional application No. 62/876,087, filed on Jul. 19, 2019, provisional application No. 62/871,096,
(Continued)

(51) Int. Cl.
*G06F 21/46* (2013.01)
*H04L 9/32* (2006.01)
*G06F 21/36* (2013.01)

(52) U.S. Cl.
CPC .............. *G06F 21/46* (2013.01); *G06F 21/36* (2013.01); *H04L 9/3236* (2013.01)

(58) Field of Classification Search
CPC ......... G06F 21/46; G06F 21/36; H04L 9/3236
See application file for complete search history.

(56) References Cited

U.S. PATENT DOCUMENTS

| 5,465,084 | A | * | 11/1995 | Cottrell | G06F 21/36 |
| | | | | | 340/5.27 |
| 7,124,433 | B2 | * | 10/2006 | Little | G06F 21/36 |
| | | | | | 713/182 |

(Continued)

FOREIGN PATENT DOCUMENTS

CN  105976517 A  9/2016
EP  3559889     1/2022
(Continued)

OTHER PUBLICATIONS

International Preliminary Report on Patentability for International Application No. PCT/US2020/021581 dated Sep. 16, 2021.
(Continued)

*Primary Examiner* — James R Turchen
(74) *Attorney, Agent, or Firm* — Gardella Grace P.A.

(57) ABSTRACT

Online user account access control with authentication challenge level adjustable based on a level of match between observed attributes of a present login attempt and corresponding recorded attributes for the authentic user for the entered user identifier (UID). Login candidates whose attributes sufficiently closely match the recorded attributes for the entered UID are allowed to select an authentication graphic pattern registered for the UID from a set of alternatives, with the degree of complexity of such selection-based authentication increasing according to the degree of difference between the observed attributes of the present login attempt and the corresponding recorded values for the UID, while by default, login candidates are requested to produce the registered authentication graphic pattern from blank slate. Accordingly, authentic, but only authentic, users are able to login with high convenience, with the underlying graphic pattern-based passcode protected against dictionary-
(Continued)

US 11,599,624 B2

Page 2 based and brute-force attacks, or capture, by unauthorized parties.

12 Claims, 5 Drawing Sheets

Related U.S. Application Data filed on Jul. 6, 2019, provisional application No. 62/868,756, filed on Jun. 28, 2019, provisional application No. 62/857,573, filed on Jun. 5, 2019.

(56) References Cited

U.S. PATENT DOCUMENTS

| | | | |
|---|---|---|---|
| 7,219,368 B2 | 5/2007 | Juels et al. | |
| 7,702,629 B2 | 4/2010 | Cytron et al. | |
| 7,844,825 B1* | 11/2010 | Neginsky | G06F 21/83 |
| | | | 713/184 |
| 8,189,905 B2 | 5/2012 | Eaton et al. | |
| 8,458,485 B2* | 6/2013 | Bandyopadhyay | |
| | | | G06F 21/6218 |
| | | | 726/19 |
| 8,539,550 B1 | 9/2013 | Terres et al. | |
| 8,601,552 B1 | 12/2013 | Bowers et al. | |
| 8,718,374 B2* | 5/2014 | Ashbrook | G06F 21/36 |
| | | | 382/188 |
| 8,789,206 B2* | 7/2014 | Harris | G06F 21/36 |
| | | | 726/28 |
| 8,868,919 B2* | 10/2014 | Barton | G06F 21/36 |
| | | | 713/184 |
| 8,881,251 B1* | 11/2014 | Hilger | H04L 63/083 |
| | | | 726/19 |
| 8,904,479 B1* | 12/2014 | Johansson | G06F 21/36 |
| | | | 382/181 |
| 8,931,060 B2 | 1/2015 | Bidare | |
| 8,955,074 B2* | 2/2015 | Barton | H04L 63/083 |
| | | | 713/182 |
| 9,104,855 B2 | 8/2015 | Vargas et al. | |
| 9,111,073 B1* | 8/2015 | Jiang | G06F 21/36 |
| 9,117,068 B1 | 8/2015 | Zhang et al. | |
| 9,165,159 B1 | 10/2015 | McDonnell | |
| 9,215,072 B1* | 12/2015 | Barton | G06F 21/36 |
| 9,230,079 B2 | 1/2016 | Yun | |
| 9,235,715 B1* | 1/2016 | Bailey | G06F 21/602 |
| 9,348,981 B1* | 5/2016 | Hearn | H04L 9/3271 |
| 9,813,409 B2 | 11/2017 | Zia | |
| 10,013,546 B1 | 7/2018 | Johansson et al. | |
| 10,120,989 B2 | 11/2018 | Anson | |
| 10,169,565 B2 | 1/2019 | Zia | |
| 10,176,315 B2 | 1/2019 | Riddiford | |
| 10,754,814 B1 | 8/2020 | Li et al. | |
| 10,754,936 B1 | 8/2020 | Hawes et al. | |
| 11,042,880 B1 | 6/2021 | Hazan et al. | |
| 2004/0143750 A1* | 7/2004 | Kulack | G06F 21/577 |
| | | | 726/25 |
| 2005/0097320 A1* | 5/2005 | Golan | G06Q 20/4014 |
| | | | 713/166 |
| 2006/0174339 A1 | 8/2006 | Tao | |
| 2006/0206918 A1 | 9/2006 | McLean | |
| 2008/0208777 A1 | 8/2008 | Stephens | |
| 2009/0037986 A1* | 2/2009 | Baker | G06F 21/31 |
| | | | 726/5 |
| 2009/0187962 A1 | 7/2009 | Brenneman et al. | |
| 2010/0043062 A1* | 2/2010 | Alexander | H04L 9/3226 |
| | | | 726/6 |
| 2010/0251388 A1 | 9/2010 | Dorfman | |
| 2011/0010763 A1 | 1/2011 | Beardslee | |
| 2012/0026109 A1 | 2/2012 | Baba | |
| 2012/0066650 A1 | 3/2012 | Tirpak et al. | |
| 2012/0084734 A1* | 4/2012 | Wilairat | G06F 21/629 |
| | | | 345/173 |
| 2012/0252409 A1* | 10/2012 | Cao | G06F 21/36 |
| | | | 455/410 |
| 2013/0044954 A1 | 2/2013 | Ashbrook | |
| 2013/0139226 A1 | 5/2013 | Welsch et al. | |
| 2013/0276100 A1* | 10/2013 | Yi | G06F 21/36 |
| | | | 726/19 |
| 2013/0276125 A1 | 10/2013 | Bailey | |
| 2013/0347066 A1 | 12/2013 | Wells et al. | |
| 2014/0025467 A1* | 1/2014 | Nagarajan | G06Q 30/02 |
| | | | 705/14.26 |
| 2014/0115670 A1* | 4/2014 | Barton | G06F 21/36 |
| | | | 726/4 |
| 2014/0157382 A1 | 6/2014 | Ford | |
| 2014/0165186 A1 | 6/2014 | Ramu et al. | |
| 2014/0195974 A1 | 7/2014 | Ballard et al. | |
| 2014/0344186 A1 | 11/2014 | Nadler | |
| 2014/0359300 A1 | 12/2014 | Shirakawa | |
| 2014/0365904 A1 | 12/2014 | Kim et al. | |
| 2015/0012444 A1 | 1/2015 | Brown et al. | |
| 2015/0143509 A1 | 5/2015 | Selander et al. | |
| 2015/0324559 A1* | 11/2015 | Boss | G06Q 50/01 |
| | | | 726/1 |
| 2016/0110528 A1 | 4/2016 | Gupta et al. | |
| 2016/0132673 A1 | 5/2016 | Birk et al. | |
| 2016/0150260 A1 | 5/2016 | Ovide | |
| 2016/0253288 A1 | 9/2016 | Reddy | |
| 2016/0277439 A1 | 9/2016 | Rotter et al. | |
| 2017/0064555 A1 | 3/2017 | Johansson et al. | |
| 2017/0132404 A1 | 5/2017 | Tao | |
| 2017/0308644 A1 | 10/2017 | van Rooyen et al. | |
| 2017/0317993 A1 | 11/2017 | Weber et al. | |
| 2017/0323092 A1 | 11/2017 | Thakur et al. | |
| 2017/0331817 A1 | 11/2017 | Votaw et al. | |
| 2018/0032714 A1* | 2/2018 | Zia | G06F 21/46 |
| 2018/0053274 A1 | 2/2018 | Kendall et al. | |
| 2018/0107920 A1 | 4/2018 | Jayaraman et al. | |
| 2018/0253717 A1 | 9/2018 | Kim et al. | |
| 2018/0300178 A1 | 10/2018 | Sandstrom | |
| 2019/0012074 A1 | 1/2019 | Ajayan et al. | |
| 2019/0034613 A1 | 1/2019 | Jajoo et al. | |
| 2019/0057207 A1* | 2/2019 | Schwartz | G06F 21/36 |
| 2019/0095605 A1 | 3/2019 | Gupta et al. | |
| 2019/0137955 A1 | 5/2019 | Fahrenkopf et al. | |
| 2019/0312861 A1 | 10/2019 | Kairi et al. | |
| 2019/0316794 A1 | 10/2019 | Song et al. | |
| 2019/0347586 A1 | 11/2019 | Kaulgud et al. | |
| 2020/0026843 A1* | 1/2020 | Anwar | G06F 3/0446 |
| 2020/0065469 A1 | 2/2020 | Norris, III | |
| 2020/0066392 A1 | 2/2020 | Bess et al. | |
| 2020/0090240 A1 | 3/2020 | Sinha et al. | |
| 2020/0104737 A1 | 4/2020 | Abaci et al. | |
| 2020/0110651 A1 | 4/2020 | Milman | |
| 2020/0134167 A1 | 4/2020 | Craymer et al. | |
| 2020/0167914 A1 | 5/2020 | Stamatoyannopoulos et al. | |
| 2020/0285645 A1 | 9/2020 | Sandstrom | |
| 2020/0288306 A1 | 9/2020 | Do et al. | |
| 2020/0311250 A1 | 10/2020 | Sandstrom | |
| 2020/0311586 A1 | 10/2020 | Sandstrom | |

FOREIGN PATENT DOCUMENTS

| | | |
|---|---|---|
| EP | 3980910 | 4/2022 |
| FR | 3 037 684 A1 | 12/2016 |
| IN | 202117043365 A | 1/2022 |
| JP | 2014211818 A | 11/2014 |
| RU | 2672394 C1 | 11/2018 |
| WO | 2020/181268 A1 | 9/2020 |
| WO | 2020/247800 A1 | 12/2020 |
| WO | 2020247800 | 12/2020 |

OTHER PUBLICATIONS

International Preliminary Report on Patentability for International Application No. PCT/US2020/036394 dated Dec. 16, 2021.
International Search Report and Written Opinion issued in International Application No. PCT/US2020/036394 dated Sep. 30, 2020.
Kaur, et al., "Multi-Factor Graphical Password for Cloud Interface Authentication Security", International Journal of Computer Applications, vol. 125, No. 7, Sep. 2015, pp. 32-35.

(56) References Cited

OTHER PUBLICATIONS

"Grid Locker", accessed at "https://www.f88x.com/modules/grid-locker-draw-a-plugin-wp-password-wordpress-utilities-download.html" accessed on Mar. 19, 2020.
Invitation to Pay Additional Fees and, Where Applicable, Protest Fee of PCT Application No. PCT/US2020/021581 dated May 5, 2020.
Invitation to Pay Additional Fees and, Where Applicable, Protest Fee for International Application No. PCT/US2020/036394 dated Jul. 21, 2020.
International Search Report and Written Opinion for International Application No. PCT/US2020/021581 dated Jul. 22, 2020.
Gewali, et al., "Machine Learning Based Hyperspectral Image Analysis: A Survey", Rochester Institute of Technology, Rochester, NY, arXiv: 1802.08701v2, Feb. 10, 2019, pp. 1-46.
Grzegorczyk, et al., "Vector Representations of Text Data in Deep Learning", AGH University of Science and Technology, Faculty of Computer Science, Electronics and Telecommunications, Department of Computer Science, arXiv: 1901.01695v1, Jan. 7, 2019.
Non-Final Office Action dated Apr. 6, 2022 in U.S. Appl. No. 16/834,961.
Non-Final Office Action dated Jun. 6, 2022 in U.S. Appl. No. 16/812,158.
Notice of Allowance dated Jul. 19, 2022 in U.S. Appl. No. 16/834,961.
Non-Final Office Action dated Jul. 25, 2022 in U.S. Appl. No. 16/798,310.

\* cited by examiner

Matrix #1)

|   | 1 | 2 | 3 | 4 | 5 | 6 | 7 | 8 | 9 | 10 | 11 |
|---|---|---|---|---|---|---|---|---|---|----|----|
| 1 | ■ |   | ■ | ■ | ■ | ■ | ■ | ■ | ■ | ■  | ■  |
| 2 | ■ |   | ■ | ■ | ■ | ■ | ■ | ■ | ■ | ■  | ■  |
| 3 | ■ |   | ■ | ■ | ■ | ■ | ■ | ■ | ■ | ■  | ■  |
| 4 | ■ |   | ■ | ■ | ■ | ■ | ■ | ■ | ■ | ■  | ■  |
| 5 |   |   | ■ | ■ | ■ | ■ | ■ | ■ | ■ | ■  | ■  |
| 6 | ■ |   | ■ | ■ | ■ | ■ | ■ | ■ | ■ | ■  | ■  |
| 7 | ■ |   |   |   |   |   |   |   |   |    |    |
| 8 | ■ |   | ■ | ■ | ■ | ■ | ■ | ■ | ■ | ■  | ■  |
| 9 | ■ |   | ■ | ■ | ■ | ■ | ■ | ■ | ■ | ■  | ■  |
| 10| ■ |   | ■ | ■ | ■ | ■ | ■ | ■ | ■ | ■  | ■  |
| 11| ■ |   | ■ | ■ | ■ | ■ | ■ | ■ | ■ | ■  | ■  |

FIG. 3

Matrix #2)

|    | 1 | 2 | 3 | 4 | 5 | 6 | 7 | 8 | 9 | 10 | 11 |
|----|---|---|---|---|---|---|---|---|---|----|----|
| 1  | ■ | ■ | ■ |   | ■ | ■ | ■ | ■ | ■ | ■  | ■  |
| 2  | ■ | ■ | ■ |   | ■ | ■ | ■ | ■ | ■ | ■  | ■  |
| 3  | ■ | ■ | ■ |   | ■ | ■ | ■ | ■ | ■ | ■  | ■  |
| 4  | ■ | ■ | ■ |   | ■ | ■ | ■ | ■ | ■ | ■  | ■  |
| 5  |   |   | ■ |   | ■ | ■ | ■ | ■ | ■ | ■  | ■  |
| 6  |   | ■ |   |   |   |   |   |   |   |    |    |
| 7  | ■ | ■ | ■ |   | ■ | ■ | ■ | ■ | ■ | ■  | ■  |
| 8  | ■ | ■ | ■ |   | ■ | ■ | ■ | ■ | ■ | ■  | ■  |
| 9  | ■ | ■ | ■ |   | ■ | ■ | ■ | ■ | ■ | ■  | ■  |
| 10 | ■ | ■ | ■ |   | ■ | ■ | ■ | ■ | ■ | ■  | ■  |
| 11 | ■ | ■ | ■ |   | ■ | ■ | ■ | ■ | ■ | ■  | ■  |

FIG. 4A

Matrix #3)

|    | 1 | 2 | 3 | 4 | 5 | 6 | 7 | 8 | 9 | 10 | 11 |
|----|---|---|---|---|---|---|---|---|---|----|----|
| 1  | ■ | ■ | ■ | ■ | ■ | ■ | ■ |   | ■ | ■  | ■  |
| 2  | ■ | ■ | ■ | ■ | ■ | ■ | ■ |   | ■ | ■  | ■  |
| 3  | ■ | ■ | ■ | ■ | ■ | ■ | ■ |   | ■ | ■  | ■  |
| 4  | ■ | ■ | ■ | ■ | ■ | ■ | ■ |   | ■ | ■  | ■  |
| 5  |   |   ■ |   |   |   |   |   |   |    |    |
| 6  | ■ |   | ■ | ■ | ■ | ■ | ■ |   | ■ | ■  | ■  |
| 7  |   | ■ | ■ | ■ | ■ | ■ | ■ |   | ■ | ■  | ■  |
| 8  | ■ | ■ | ■ | ■ | ■ | ■ | ■ |   | ■ | ■  | ■  |
| 9  | ■ | ■ | ■ | ■ | ■ | ■ | ■ |   | ■ | ■  | ■  |
| 10 | ■ | ■ | ■ | ■ | ■ | ■ | ■ |   | ■ | ■  | ■  |
| 11 | ■ | ■ | ■ | ■ | ■ | ■ | ■ |   | ■ | ■  | ■  |

FIG. 4B

Matrix #4)

|    | 1 | 2 | 3 | 4 | 5 | 6 | 7 | 8 | 9 | 10 | 11 |
|----|---|---|---|---|---|---|---|---|---|----|----|
| 1  | G | G | G | G | G | G | G | G | G | G  | G  |
| 2  | G | G | G | G | G | G | G | G | G | G  | G  |
| 3  | G | G | G | G | G | G | G | G | G | G  | G  |
| 4  | G | G | G | G | G | G | G | G | G | G  | G  |
| 5  | G | G | G | G | G | G | G | G | G | G  | G  |
| 6  | G | G | G | G | G | ■ | G | G | G | G  | G  |
| 7  | G | G | G | G | G | G | G | G | G | G  | G  |
| 8  | G | G | G | G | G | G | G | G | G | G  | G  |
| 9  | G | G | G | G | G | G | G | G | G | G  | G  |
| 10 | G | G | G | G | G | G | G | G | G | G  | G  |
| 11 | G | G | G | G | G | G | G | G | G | G  | G  |

FIG. 4C

GRAPHIC PATTERN-BASED PASSCODE GENERATION AND AUTHENTICATION

CROSS-REFERENCE TO RELATED APPLICATIONS

This application claims priority to the following applications: U.S. Provisional Patent Application Ser. No. 62/857,573, entitled "Online Trained Object Estimator", filed on Jun. 5, 2019; U.S. Provisional Patent Application Ser. No. 62/868,756, entitled "Graphic Pattern Based Authentication", filed on Jun. 28, 2019; U.S. Provisional Patent Application Ser. No. 62/871,096, entitled "Graphic Pattern Based Passcode Generation and Authentication", filed on Jul. 6, 2019; and U.S. Provisional Patent Application Ser. No. 62/876,087, entitled "Graphic Pattern Based User Passcode Generation and Authentication", filed on Jul. 19, 2019.

This application is related to the following patent applications by ThroughPuter, Inc.: U.S. patent application Ser. No. 16/798,310, entitled "Online Trained Object Property Estimator", filed on Feb. 22, 2020; U.S. patent application Ser. No. 16/812,158, entitled "ONLINE TRAINED OBJECT PROPERTY ESTIMATOR", filed on Mar. 6, 2020; and U.S. patent application Ser. No. 16/834,961, entitled "Graphic Pattern-Based Authentication with Adjustable Challenge Level", filed on Mar. 30, 2020.

All above identified applications are hereby incorporated by reference in their entireties.

BACKGROUND

Technical Field

The following disclosure pertains to the field of online user access control, more precisely, to efficient creation and validation of strong-security user passcodes using memorizable graphic patterns.

DESCRIPTIONS OF THE RELATED ART

Conventional passcodes are typically at least either (1) difficult for the user to remember, such that users would tend to resort to unsecure practices for storing the non-memorized passcodes and/or leaving their online accounts open whenever possible, or (2) easy for unauthorized parties to guess, even e.g. by a brute-force effort to see what original passcode would create an encrypted or hashed passcode obtained for instance when in-transit on the network or stored on the server side. Moreover, biometric etc. advanced, multi-factor user authentication schemes are costly, inconvenient and/or cause operational inefficiencies, yet they often have limited usage due to special requirements for the authentication end-points, which are hard to get universally supported. Multi-factor authentication operations will furthermore involve multiple forms of special cases, leading to multitude of operational and security challenges that can be hard to predict in advance as well as to manage in practice. There thus is a need for inventions enabling the efficient creation and validation of strong-security passcodes, which are not vulnerable either to brute-force attacks or peer human users' attempts to learn other users' access credentials, and yet can be safely and conveniently reproduced by their authorized users.

SUMMARY

In one aspect, the present disclosure relates to a method for providing access control to a computer system, implemented by hardware logic and/or software logic, the method including generating, for presentation on a display of a computing device, a passcode creation user interface including an array of user-selectable graphic elements, receiving, via the passcode creation user interface, a pattern of user selections for the user-selectable graphic elements of the array, the pattern including, for each element of at least a portion of the user-selectable elements, a respective fill option of a number of fill options selected by a given user for filling the respective element. The method may include converting the pattern into a digital vector, where converting includes encoding the fill options selected by the given user for the pattern into a number of digital codes, each code corresponding to the fill option selected by the given user for a respective element of the pattern, and concatenating the number of digital codes into the digital vector. The method may include applying a transformation to the digital vector to form a scrambled digital vector, and registering, in a non-transitory computer readable medium, the scrambled digital vector as a registered passcode associated with the given user. The method may include, at a future time, authenticating a candidate identifying as the given user, where the authenticating includes generating, for presentation on the display of the computing device, a passcode entry user interface configured to prompt the user to produce a replicated pattern, where the replicated pattern is produced by the candidate by (i) entering at least a requested part of the pattern, and/or (ii) selecting, from a number of graphical pattern options, a graphical pattern sufficiently closely matching the correct pattern for the given user. The method may include converting the replicated pattern into a trial digital vector, applying the transformation to the trial digital vector to form a scrambled trial digital vector, comparing the scrambled trial digital vector to the registered passcode, and determining authentication of the candidate based on the comparison.

In some embodiments, applying the transformation includes hashing the digital vector. Applying the transformation may include encrypting the digital vector and hashing the digital vector. The method may include, prior to converting the pattern, confirming adequate complexity of the pattern. Confirming adequate complexity may include identifying, within the pattern, at least two different fill options of the number of fill options.

In some embodiments, the method includes calculating a correctness score for the scrambled trial digital vector based on the comparing, where determining the authentication is based on the correctness score being within an acceptable range of scores. The number of fill options may include a number of colors. The number of fill options may include a number of fill patterns. The number of fill options may include a number of symbols and/or pictures. The matrix of user-selectable graphic regions may be arranged as a grid of boxes. The matrix of user-selectable graphic regions may be arranged as a triangle, pyramid, diamond, or other shape. The shape of the user-selectable graphic regions may be square, rectangular, triangular, round, oval, hexagonal, or octagonal. The shape of the matrix and/or the user-selectable graphic regions may be selected by the user from a set of shape options (e.g., via a user interface selection menu such as a drop down menu). An orientation of the matrix of user-selectable graphic regions may be user-adjustable (e.g., through rotation, etc.) or user-selectable. The matrix may be a three-dimensional matrix (e.g., cube, pyramid, etc.). A combination of a number of the user selectable graphic regions and a number of the number of fill options may provide a passcode entropy of at least 400 bits.

In one aspect, the present disclosure relates to an authenticating system including a user interface for (i) presenting, for a login candidate, a set of one or more authentication screens of a variable challenge level, at least one of the set of authentication screens being configured to prompt the candidate to produce a graphic pattern of a given user of a number of registered users, where the login candidate is identifying as the given user, and (ii) observing characteristics of the candidate. The system may include a server storing respective model characteristics for each of the number of registered users, and hardware and/or software logic configured to execute a process including, based at least in part on a comparison of the observed characteristics of the login candidate with the model characteristics stored for the given user, forming an assessment of risk that the login candidate is unauthentic, and adjusting the challenge level according to the assessment of risk, through a) directing the login candidate to one of a set of at least two authentication subprocesses, where in a first subprocess of the at least two authentication subprocesses corresponding to a higher value of the assessment of risk that the login candidate is unauthentic, the candidate is required to produce the graphic pattern registered for the given user from a set of basic elements, and in a second subprocess of the at least two authentication subprocesses corresponding to a lower value of the assessment of risk, the candidate is required to produce the graphic pattern by selecting, from an array of alternative graphic patterns, a pattern sufficiently close to the graphic pattern registered for the given user, and/or b) over at least a certain range of values of the assessment of risk, for elevating values of the assessment of risk, increasing complexity for each screen of the set of authentication screens presented to the login candidate, increasing a number of successive challenge screens of the set of authentication screens presented to the login candidate, or reducing time given to the login candidate to respond to each screen of the set of authentication screens.

In some embodiments, directing the login candidate to the first subprocess includes generating, for presentation as a screen of the set of authentication screens, a passcode creation user interface including an array of user-selectable graphic elements, and receiving, via the passcode creation user interface, a pattern of user selections for the user-selectable graphic elements of the array, the pattern including, for each element of at least a portion of the user-selectable elements, a respective fill option of a number of fill options selected by a given user for filling the respective element. Directing the login candidate to the second subprocess may include generating, for presentation as a screen of the set of authentication screens, a passcode selection user interface including the array of alternative graphic patterns, receiving, via the passcode selection user interface, selection of one of the alternative graphic patterns, and generating, for presentation as a next screen of the set of authentication screens, a passcode selection user interface including a second array of alternative graphic patterns different than the array of alternative graphic patterns, where a number of screens of the set of authentication screens is determined in part based upon the assessment of risk.

In some embodiments, adjusting the challenge level includes adjusting a level of match considered as being sufficiently close to the graphic pattern registered for the given user. The second subprocess may include receiving selection of a selected graphic pattern of the array alternative graphic patterns, and determining whether the selected graphic pattern is sufficiently close to the graphic pattern of the given user, where the level of match is applied in the determining. The characteristics of the login candidate may include at least one of characteristics of typing of a user identifier of the given user at a keyboard, or characteristics of usage of another input device beyond a keyboard by the login candidate for interacting with the user interface.

In some embodiments, the graphic pattern is a graphic pattern series including two or more graphic pattern segments. Increasing the number of successive challenge screens may include increasing a number of segments of the two or more graphic pattern segments that the login candidate is required to produce in either the first subprocess or the second subprocess.

In one aspect, the present disclosure relates to a method including presenting, to a login candidate via a browser interface at a display of a computing device, a request for identification as one of a number of registered users, and obtaining, through the browser interface by processing circuitry including hardware logic and/or software logic, characteristics of the login candidate including characteristics of interactions with the user interface and/or observed hardware, software, network or login activity characteristics of the login candidate, where the candidate, responsive to the request for identification, identified as a given user of the number of registered users. The method may include comparing, by the processing circuitry, the characteristics of the login candidate with model characteristics corresponding to the given user and, based on the comparing, forming a risk assessment representing predicted authenticity of the login candidate. The method may include presenting, to the login candidate via the browser interface, a login challenge user interface prompting the login candidate to produce a graphic pattern of the given user, where a challenge level of the login challenge user interface is set according to the risk assessment, and for a higher challenge level, the login challenge user interface presents, to the login candidate via the browser interface, a set of basic editing constructs for reproducing the graphic pattern of the given user, and for a lower challenge level, the login challenge user interface presents, to the login candidate via the browser interface, a collection of alternative graphic patterns, where the login candidate is prompted to select, from the collection of alternative graphic patterns, a pattern closely matching the graphic pattern of the given user.

In some embodiments, the method includes receiving, responsive to user interaction with the login challenge user interface, response data corresponding to a candidate graphic pattern, and determining, by the processing circuitry, whether the response data is within a threshold difference of matching the graphic pattern registered for the given user. Determining whether the response data is within the threshold distance of matching may include transforming the candidate graphic pattern into a candidate digital vector, and comparing the candidate digital vector to a registered digital vector stored as a representation of the graphic pattern registered for the given user. The threshold difference may correspond to an exact match.

In some embodiments, the set of basic editing constructs includes at least one of a set of graphic pattern element shapes, wherein a plurality of graphic pattern elements each having a same shape is arranged into a graphic pattern matrix, a set of matrix shape options for arranging the plurality of graphic pattern elements into a selected matrix shape of the set of matrix shape options, or a user-adjustable matrix orientation for orienting the graphic pattern matrix.

In one aspect, the present disclosure relates to a method for access control for an online user account, implemented by hardware logic and/or software logic, including prompting a login candidate to enter a registered user identifier (UID), recording a feature vector (FV) including a number of components each representing a respective observed aspect of a number of observed aspects of the login candidate, where the recorded FV is a present FV of a present login attempt, and retrieving, from a database, information for a set of model FVs representing respective successful login attempts of a number of login attempts for the entered UID. The method may include, based on a comparison of the present FV with the information for the set of model FVs, forming an assessment of risk that the login candidate is unauthentic, and adjusting a level of authentication challenge for the login candidate based at least in part on the assessment. Adjusting the level of authentication challenge may include, as a condition for a successful login of the login candidate, for a certain value of the assessment corresponding to a higher risk that the login candidate is unauthentic, requiring the login candidate to produce, from an empty outline, a graphic pattern registered for the entered UID, and for a certain other value of the assessment corresponding to a lower risk that the login candidate is unauthentic, prompting the login candidate to select, from a displayed set of alternative completed graphic patterns, a completed pattern that is sufficiently close to the graphic pattern registered for the entered UID.

In some embodiments, the adjusting of the level of authentication challenge includes, for elevating values of the assessment corresponding to the lower risk that the login candidate is unauthentic, correspondingly elevating the authentication challenge for the login candidate through increasing a total number of graphic patterns in the displayed set of alternative completed graphic patterns from which login candidate is to select one sufficiently close to the graphic pattern registered for the entered UID, increasing a number of successive menus of alternative completed graphic patterns from each of which the login candidate is to select one sufficiently close to the graphic pattern registered for the entered UID, decreasing a number of alternative graphic patterns among the displayed set of alternative completed graphic patterns that are deemed as sufficiently close to the graphic pattern registered for the entered UID, or decreasing a time limit by which the login candidate is required to select from the displayed set of alternative completed graphic patterns one sufficiently close to the graphic pattern registered for the entered UID.

In some embodiments, the graphic pattern registered for the entered UID is a graphic pattern sequence including a defined length of stages, and the adjusting of the level of authentication challenge further includes, for elevating values of the assessment corresponding to the lower risk that the login candidate is unauthentic, correspondingly elevating the authentication challenge for the login candidate through increasing a number, up to the defined length, of successive menus, where each menu of the successive menus includes a respective set of alternative completed graphic pattern stages from which the login candidate is required to select one graphic pattern stage sufficiently close to a corresponding respective stage of the graphic pattern sequence registered for the entered UID. The graphic pattern may include an array of user-definable elements. The empty outline may include a number of user-selectable graphic elements.

In some embodiments, a user corresponding to the entered UID is referred to as the authentic user, and the graphic pattern registered for the entered UID includes an array of user-selectable elements, for each of which the authentic user made a selection when opening the user account or when resetting the graphic pattern registered for the entered UID.

In some embodiments, the number of observed aspects of the login candidate include one or more of the following: characteristics of typing of the UID by the login candidate, characteristics of usage of another input device beyond a keyboard by the login candidate, information of a user device hardware and/or software being used by the login candidate, one or more network addresses of the login session for the login candidate, or information of a web browser being used by the login candidate. The method may include, at least in some cases where the login candidate is ascertained as authentic, storing the present FV as one of the set of model FVs for the entered UID.

In some embodiments, the method includes, at least in some cases where the login candidate is ascertained as unauthentic, storing the present FV as one of a set of invalid FVs. The comparison may include determining whether the present FV is closer to the set of model FVs for the entered UID than to a set alternate FVs, the set of alternate FVs representing login attempts by login candidates that are unauthentic for the account of the entered UID, where the set of alternate FVs include at least a portion of the set of invalid FVs, and forming the assessment includes classifying the login candidate as likely authentic for the entered UID in cases where the present FV is closer to the set of model FVs, and otherwise classifying the login candidate as likely unauthentic. The set of alternative FVs may include at least some FVs formed based on FVs stored for accounts of other UIDs.

In some embodiments, the comparison includes determining whether the present FV is closer to the set of model FVs for the entered UID than to a set alternative FVs, the set of alternative FVs representing login attempts by login candidates that are unauthentic for the account of the entered UID, and forming the assessment includes classifying the login candidate as likely authentic for the entered UID in cases where the present FV is closer to the set of model FVs, and otherwise classifying the login candidate as likely unauthentic. The set of alternative FVs may include two or more subsets, including (i) a subset including FVs of login attempts for the account of the entered UID by candidates determined to be unauthentic, and (ii) a subset of FVs formed based on models FVs of other UIDs. Determining that the present FV is closer to the set of model FVs for the entered UID may include determining that the present FV is closer to the set of model FVs than to any subset of the set of alternative FVs.

In some embodiments, the comparison includes determining a measure of difference between the present FV and the set of model FVs for the entered UID, and forming the assessment of risk includes calculating a risk score based on said measure of difference, for that the login candidate is unauthentic, with said risk score used to adjust the level of authentication challenge for the login candidate.

In one aspect, the present disclosure relates to a system including one or more non-transitory computer readable databases storing a number of user records, each record corresponding to a respective user identifier (UID) of a number of user identifiers generated for a number of registered users, where each record of the number of user records includes a set of model feature vectors (FVs), where each FV of the set of model FVs includes a number of components, where at least a portion of the set of model FVs corresponds to previous login attempts by an authentic user of the UID, and information for a graphic pattern registered for the authentic user. The system may include hardware logic and/or software logic executing on processing circuitry configured to execute operations including exchanging, via a network between a computing device presenting an interactive user interface for a login session to a login candidate and the one or more databases, information for a login attempt including a present UID of the number of UIDs and a number of attributes of the login attempt, forming, from the number of attributes, a session feature vector (FV) for the login session by recording, in corresponding components of the number of components, information regarding each attribute of the number of attributes, accessing, from the one or more databases, the set of model FVs of the present UID, calculating a risk assessment of the login attempt based at least in part on comparing the session FV to the set of model FVs of the present UID, and applying at least the risk assessment to select a type from at least two types of authentication challenge for the login candidate, where a first type corresponds to a higher risk that the login candidate is unauthentic, and a second type corresponds to a lower risk that the login candidate is unauthentic. The operations may include providing, to the computing device via the network, a passcode challenge corresponding to the selected type where, when the selected type is the first type, the passcode challenge includes providing, on a display of the computing device, a number of blank user-selectable graphic elements, where the login candidate is prompted to produce, from the number of blank user-selectable graphic elements, the graphic pattern registered for the present UID, and when the selected type is the second type, the passcode challenge includes providing, on the display of the computing device, a set of alternative completed graphic patterns, where the login candidate is prompted to select, from the set of alternative completed graphic patterns, a respective pattern that most closely resembles the graphic pattern registered for the present UID.

In some embodiments, the set of alternative completed graphic patterns includes at least two graphic patterns sufficiently close to the graphic pattern registered for the present UID, such that, when a given one of the sufficiently close graphic patterns is selected by the login candidate, the selected graphic pattern is considered a correct selection. A total number of the at least two graphic patterns may be adjusted according to the assessment of risk. Calculating the assessment of risk may include computing a risk score for the login attempt. The operations may include, after applying the risk assessment to select the second type, elevating a level authentication challenge according to an elevating value of the risk score by increasing a number of successive menus of alternative completed graphic patterns from which the login candidate is to select one sufficiently close to the graphic pattern registered for the present UID, increasing a total number of graphic patterns in the set of alternative completed graphic patterns, decreasing a number of graphic patterns in the set of alternative completed graphic patterns sufficiently close to the graphic pattern registered for the present UID, such that, when a given one of the number of sufficiently close graphic patterns is selected by the login candidate, the selected graphic pattern is considered a correct selection, or decreasing a time limit for the login candidate to select from the set of alternative completed graphic patterns.

In some embodiments, calculating the risk assessment includes computing a risk score for the login attempt, and the operations include, after applying the risk assessment to select the second type, elevating a level of authentication challenge according to an elevating value of the risk score, where the graphic pattern registered for the present UID is a graphic pattern series including two or more graphic pattern segments, and elevating the level of challenge includes increasing a number of successive selection stages presented to the login candidate on the display of the computing device, where, a given one of the successive selection stages prompts selection of one of a respective set of alternative completed graphic patterns segments, where the login candidate is deemed to have made a correct selection on the given stage if the selected alternative graphic pattern segment is among a subset of the alternative graphic pattern segments considered to be sufficiently close to the respective segment of the graphic pattern registered for the present UID.

In some embodiments, calculating the risk assessment includes computing a risk score for the login attempt, the graphic pattern registered for the present UID is a graphic pattern series including a number of stages, and the operations include, after applying the risk assessment to select the second type, elevating a level of authentication challenge according to an elevating risk score by increasing a number of successive user interface screens, up to a number of the number of stages, for presentation to the login candidate on the display of the computing device, where, each screen of the number of successive user interface screens presents a set of alternative completed graphic pattern stages from which the login candidate is required to select one graphic pattern stage sufficiently close to a respective stage of the graphic pattern sequence registered for the entered UID.

In some embodiments, the number of attributes relate to one or more of the following one or more attributes of keyboard usage by the login candidate, one or more attributes of usage of a hand-manipulated movement-tracked input/output device by the login candidate, one or more hardware attributes of the computing device, one or more software attributes of the computing device, one or more network communication attributes used by the computing device in connecting via the network, or one or more attributes of a web browser presenting the interactive user interface.

According to an embodiment of the herein disclosed graphical password generation and authentication system, an online user access control involves (1) registering a user to create for the user's account the user ID and its accompanying strong-security passcode, using a graphic pattern based passcode generation, and (2) authenticating a registered user through requesting the user to produce a valid UID and its accompanying graphic pattern. Naturally, the user registration may also involve further steps, e.g. payments and/or other forms of user authorization etc., and the authentication may also include further steps, e.g. querying the user for non-stored information that the authentic user would readily know, at least approximately, but an unauthorized party attempting the login has no access to.

An aspect of the present disclosure provides an authenticating system comprising (1) a user interface for (i) presenting for a login candidate one or more authentication screens of variable challenge levels, with at least one of such authentication screens prompting the candidate to produce a graphic pattern registered for a given user ID (UID) that the candidate is identifying as, and (ii) observing login session characteristics of the candidate, (2) a server storing respective model characteristics for registered UIDs, and (3) hardware and/or software logic for, based at least in part on a comparison of the observed characteristics of the candidate with the model characteristics stored for the given UID, forming an assessment of risk that the candidate is unauthentic, and adjusting the challenge level according to said assessment, through (a) directing the candidate to one of a set of at least two authentication sub-processes, wherein in a first of such subprocesses, corresponding to a higher assessment of risk that the candidate is unauthentic, the candidate is required to produce the registered graphic pattern of the given UID from its basic elements, while in a second of such subprocesses, corresponding to a lower assessment of said risk, the candidate is required to produce said graphic pattern by selecting, from each of a series of one or more menus of pre-completed alternative graphic patterns, an alternative completed pattern sufficiently close to the graphic pattern registered for the given UID, and/or (b) over at least a certain range of values of the assessment corresponding to the lower assessment of said risk, for elevating values of the assessment, (i) increasing complexity for individual menus alternative graphic patterns of the series presented to that the candidate, (ii) increasing a number of successive menus of said series, or (iii) reducing time given to the candidate to respond to individual menus of said series.

An aspect of the present disclosure includes a method for access control on a computer system involving (I) registering a user, by storing for an account of the user, on a non-transitory digital memory in the computer system, a unique user ID (UID) and, through converting a user-entered graphic pattern to a hashed a digital vector, a passcode associated with the user's UID, where the user-entered graphic pattern is referred to as the graphic pattern associated with the user's UID or simply as the UID graphic pattern, and where the converting involves encoding the user's selection of graphic elements for each of a collection of graphic elements to a digital code (e.g. hexadecimal character) corresponding to each respective selection, and concatenating the codes into a digital vector and hashing of that digital vector, to form the user's passcode, and (II) authenticating a given returning user, referred to as a login candidate, through having the computer system configured to (a) request the login candidate to enter one's registered UID, (b) prompt the given login candidate to correctly produce the graphic pattern associated with the entered UID by (i) reproducing at least a requested part of the UID graphic pattern, and/or (ii) selecting, from a number of alternative graphic patterns potentially associated with the UID, a graphic pattern sufficiently closely matching the graphic pattern of the entered UID, (c) encode each of a set of graphic elements in the graphic pattern produced by the login candidate into its corresponding digital code, concatenate such codes into a digital vector and compute the hash of such digital vector, to form a trial passcode submitted by the login candidate, and (d) check whether such trial passcode produced by the login candidate matches the stored passcode associated with the entered UID, and if yes, treat the given login candidate as authenticated by the access control process, and otherwise as non-authenticated.

Moreover, at least some embodiments of such a method include further features (i) whereby any of one of the graphic patterns (1) is visualized as a graphic pattern template, providing a collection of user-selectable elements, displayed on a remote or local computer or device screen to the user, where such elements each have a color, symbol or other visual property selectable or selected from a range of alternatives, such that the user-entered graphic pattern includes an array of the user's selections for the individual elements of the graphic pattern template, and/or (2) includes a sequence of individual units of the graphic pattern templates that are editable or edited by the user, and/or (ii) where any information exchanged and/or stored among any of the communicating participants is encrypted using the recipient's public key such that only the intended recipient, using its private key, can decrypt such information, as well as encrypted using the sender's private key such that it is known to be from the valid sender in case it decrypts using the sender's public key (with such encryption scheme referred to herein as asymmetric encryption).

An aspect of the present disclosure relates to controlling access to an online account of a registered UID, based on recording and analysis of feature vectors (FV), each FV having a number of components each representing a defined observed property of the login candidate for the given login attempt. The observed properties, in some examples, may include characteristics of the login candidate's typing of the UID at a keyboard, characteristics of the login candidate's usage of an input device such as, in some examples, a mouse, stylus, swiping on a touch screen, touch pattern on the touch screen, virtual reality glove, track ball, or touch pad, information regarding hardware and/or software of a computing device being used by the login candidate, one or more network addresses of the login session for the login candidate, information regarding a web browser being used by the login candidate, time of the login attempt, and/or present login status of the entered UID. Information for a set of model FVs, each recorded during a successful login attempt for the entered UID, may be retrieved from a database for comparison to the FV captured for present login attempt, to assess of a risk score for the likelihood that the login candidate is unauthentic. In some embodiments, said comparison of the present and model FVs includes determining a measure of vector difference between the present FV and the set of model FVs for the entered UID. In at least certain operating scenarios, the level of authentication challenge for the given login candidate is adjusted according the assessed risk score.

In some embodiments, adjusting the level of authentication challenge includes, for a certain value of the risk score above a defined threshold, requiring the login candidate to produce, from a blank slate, a graphic pattern registered for the entered UID, while for risk score values below such threshold, requesting the login candidate to select from menus of alternative completed graphic patterns a graphic pattern sufficiently close to actual UID graphic pattern. In such cases, at elevating values of the risk score below said threshold, adjusting of the level of authentication challenge involves increasing a number of successive menus of such alternative completed graphic patterns from which the candidate is required to make a selection sufficiently close to the actual UID graphic pattern. In some implementations, the UID graphic pattern is composed of a graphic pattern sequence of two or more graphic pattern stages, and in such cases, when the login candidate is directed to reproduce his graphic pattern through selections from menus of completed patterns, the login candidate is requested to make one's selection for any given stage of the successive menus so as to sufficiently closely match the respective stage of the graphic pattern sequence registered for the entered UID. Further, in such scenarios, an embodiment of the authentication system per the disclosure will, in response to increasing, or decreasing, levels of the risk score below the threshold (above which the login candidate would be required to reproduce the multi-stage graphic pattern from scratch), accordingly increase, or decrease, the number of stages of the registered graphic pattern sequence for which the login candidate is required to make a sufficiently closely matching selection from the respective menu of the displayed alternative completed graphic patterns.

In some embodiments, adjusting the level of authentication challenge includes, for elevating levels of the login attempt risk score below the threshold, above which the login candidate would be required to reproduce one's graphic pattern from blank slate, will include (i) increasing a total number of graphic patterns in the displayed menus of alternative completed graphic patterns from which login candidate is to select a pattern sufficiently close to the UID graphic pattern, (ii) decreasing a number of alternative graphic patterns among the displayed menus that are deemed as sufficiently close to the UID graphic pattern, (iii) decreasing a time limit by which the login candidate is required to select from the displayed menus a completed pattern sufficiently close to the UID graphic pattern, and/or (iv) increasing the number of successive menus from which the login candidate is required to make a selection sufficiently closely matching to the respective UID graphic pattern.

In some implementations, the present FV of a login candidate is stored to supplement or update model FVs for the given UID or other example FVs, for use by the risk score assessment logic of the present disclosure. For example, in some cases where the login candidate is ascertained as authentic, present FV may be stored as one of the set of model FVs for the entered UID. Conversely, in some cases where the login candidate is ascertained as unauthentic, the present FV may be stored as one of a set of invalid FVs. For instance, the comparison of the FVs for risk score assessment may comprise determining whether the present FV is closer, with a defined margin, to an average of the set of model FVs for the entered UID than to any of a comparison set of alternate FVs representing login attempts that would be unauthentic for the entered UID account, wherein the set of alternate FVs is formed based on at least a portion of the set of invalid FVs. The set of alternative FVs may further include at least some FVs formed based on FVs stored for accounts of other UIDs. Further to the example, forming the risk score may include classifying the login candidate as likely authentic for the entered UID in cases where the present FV is sufficiently closer to the set of model FVs for the entered UID than the alternate FVs, including any sub-classes among such alternative FVs, and otherwise classifying the login candidate as likely unauthentic. In another example, the set of alternative FVs may include two or more subsets, including (i) a subset of FVs corresponding to login attempts for the account of the entered UID by candidates determined to be unauthentic, and (ii) a subset of FVs formed based on models FVs of other UIDs. Further to this example, determining that the present FV is closer to the set of model FVs for the entered UID may include determining that the present FV is closer on an average basis to the set of model FVs than to any subset of the set of alternative FVs.

The foregoing general description of the illustrative implementations and the following detailed description thereof are merely exemplary aspects of the teachings of this disclosure and are not restrictive.

BRIEF DESCRIPTION OF THE DRAWINGS

The drawings and tables (collectively, diagrams), which are incorporated in and constitute a part of the specification, illustrate one or more embodiments and, together with the description, explain these embodiments. Any values and dimensions illustrated in the diagrams are for illustration purposes only and may not necessarily represent actual or preferred values or dimensions. Where applicable, some features of embodiments may be omitted from the drawings to assist in focusing the diagrams to the features being illustrated. In the drawings:

FIG. 3 illustrates a further example of a possible memorable color pattern for a user's color matrix, that the system per the disclosure would convert to a cryptic (non-memorable) passcode.

FIGS. 4A, 4B, and 4C illustrate, as a succession of three matrices in series with the first matrix of FIG. 3, a memorable 4-matrix series of color patterns.

Figure 1:
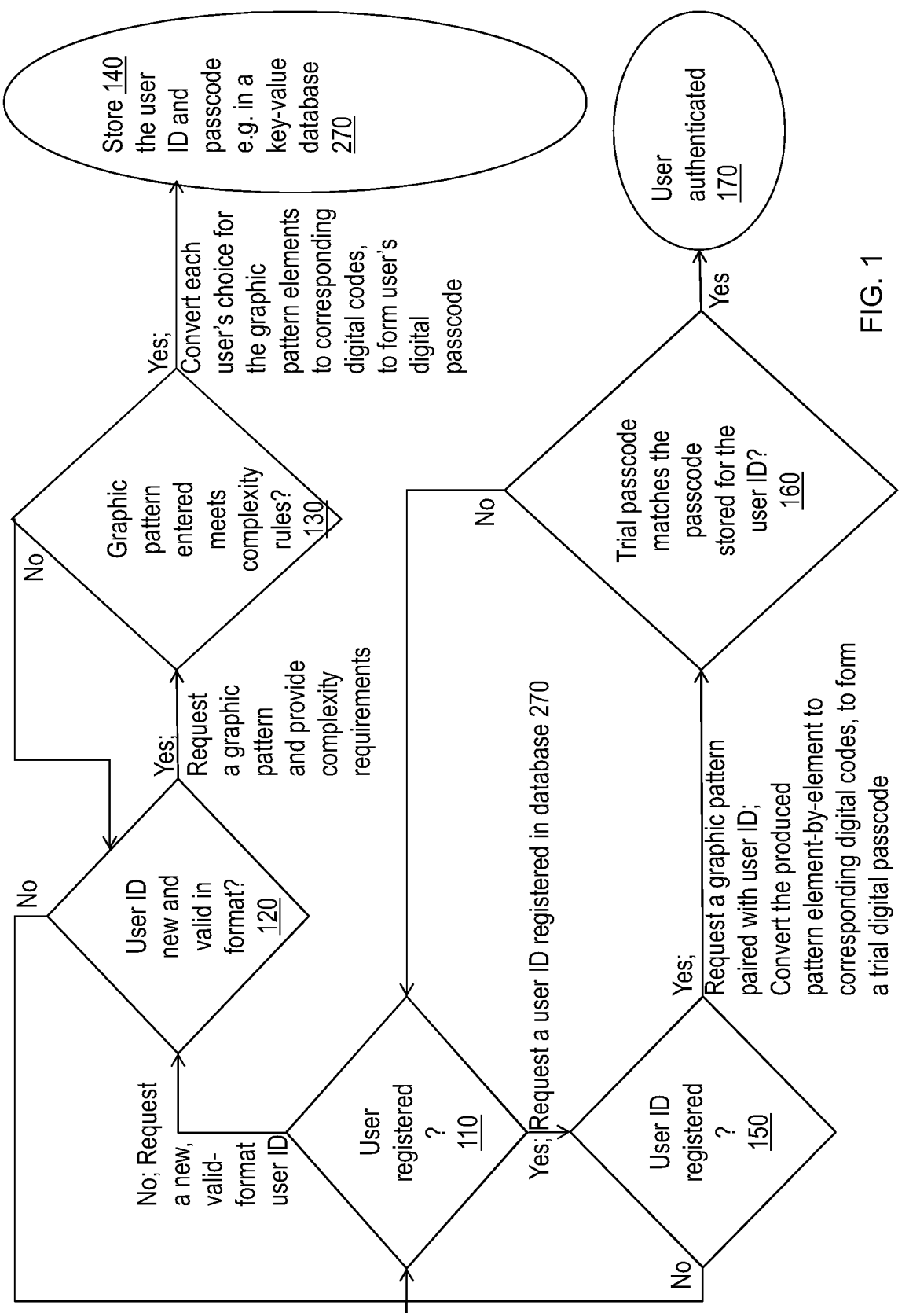
FIG. 1 illustrates a logic flow diagram of major steps for registering new users and for authenticating registered users, according to simple operating scenarios for an embodiment of the disclosed authentication system.

General symbols and notations used in the drawings:
Boxes indicate a functional module comprising digital logic.
A dotted line box may be used to mark a group of drawn elements that form a logical entity.
Arrows indicate a digital signal flow. A signal flow may include one or more parallel bit wires. The direction of an arrow indicates the direction of primary flow of information associated with it with regards to discussion of the system functionality herein, but does not preclude information flow also in the opposite direction.
An arrow reaching to a border of a hierarchical module indicate connectivity of the associated information to/from all sub-modules of the hierarchical module.
For clarity of the drawings, generally present signals for typical digital logic operation, such as clock signals, or enable, address and data bit components of write or read access buses, are not shown in the drawings.

DETAILED DESCRIPTION

According to an embodiment of the present disclosure, implemented with computer and network systems, exemplary cases of online user authentication operate per the following descriptions. For illustration, simplified examples of the sub-cases of (A) new user registration, and (B) validating passcode of a registered user, are illustrated in FIG. 1. Note that, even if not specifically mentioned or depicted, in typical embodiments of systems and methods per this description, all sensitive information, when exchanged between the communicating participants (user's agent e.g., a web browser, and the authentication system) as well as when stored the authentication system is hashed and/or encrypted, using e.g. the Public Key Infrastructure mechanism (PKI, e.g., using the secure hypertext transfer protocol (HTTPS), Transport Layer Security (TLS) or applicable successor protocols for interactions over the Internet), to prevent unauthorized access to information such as the passcodes.

The process per FIG. 1 begins by the logic of the system having a user seeking to access the given access-control domain (and its contents, functionality etc. resources) to select 110 to either, in case the user is non-registered, get registered with this login system, or in case of a registered user, log-in with the system. The sub-process for registering a new user is described below, followed by the sub-process for authenticating a returning user.

(A) Registration:

(1) In the sub-process for registering a new user, the authentication system requests 120 a non-registered user to enter a unique ID (UID, e.g. user's email address). The logic of the system checks with its database of registered UIDs whether the entered UID is available, and if not (i.e. the given UID was already registered), the system will inform the user of that fact (e.g., via displaying a message to such effect) and prompt 110 the new user to enter an actual new UID (or in case the given user remembers already having an account with the system, to get authenticated for the existing UID). Once the new user has entered a non-previously registered UID, the user registration sub-process will, e.g. via a link in an email sent to the user's email address, present to the user an array of user-selectable graphic elements. E.g., a 2-dimensional matrix of cells. to be colored by the registering user, with each cell initially marked with an inactive pattern (e.g. index of the cell), for instance per example of Table 1 below:

TABLE 1

A (small) example of to-be-colored matrix.

| 0 | 1 | 2 |
|---|---|---|
| 3 | 4 | 5 |
| 6 | 7 | 8 |

In some scenarios, the authentication system will ask the registering new user to make choices for geometric etc. attributes for the graphic pattern template to be used for authentication for this UID (UID); for instance, the system logic can request the user to choose, e.g., one of more of the following type of attributes for the graphic pattern generator to be used for authenticating the user:
  - dimensions for a matrix to be colored (in a given range, such that each of the dimensions, as well as their product, will have a defined minimum and maximum number of elements);
  - the shape of the graphic pattern made of the basic elements to be colored, e.g., a pyramid, a triangle, or a hexadecimal character in a seven-segment display system (the type commonly used in pocket calculators); and/or
  - orientation of the shape (along a dimension by which it is not symmetric).

In addition, or alternatively, the user may be given a choice that the graphic pattern elements are to be filled with one of alternative symbols (e.g., alphanumeric characters), etc. While such variations for the user's graphic pattern entry are supported by the herein described graphic pattern based digital passcode generation and authentication method, for the sake of clarity, this description proceeds by description of the case of a symmetric matrix for whose elements are to be colored by the user.

Figure 2:
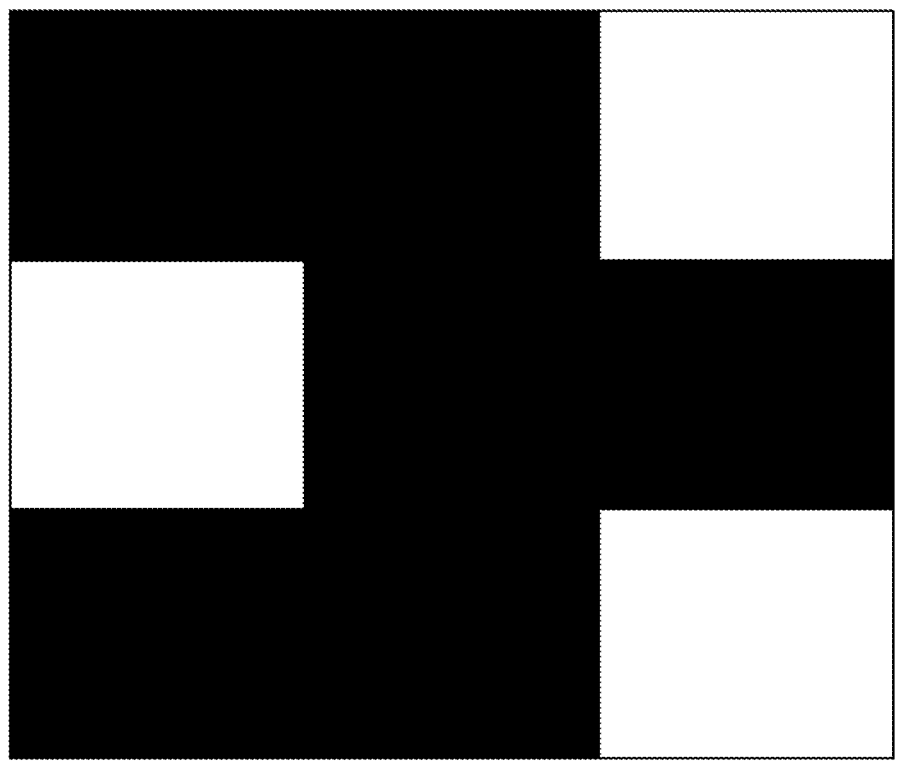
FIG. 2 illustrates a simple example of a user's graphic pattern that could be used to generate a passcode.

(2) After instructing the user to verify that no one can see the user's coloring of the grid, the authentication system gives the user the minimum complexity requirements for a color pattern (e.g. the available color palette and how many colors to use in minimum, etc.), and instructs the user to indicate once the user has chosen a memorable color pattern for the matrix. Once so indicated by the user, the system prompts the user to accordingly select one of the available colors for each cell of the matrix, e.g., per FIG. 2 (assuming available colors included black and white). For faster completion of the color matrix, in some embodiments, the system allows the user to select multiple cells at once, e.g., via the user selecting a default color for all the cells of the matrix, or by having the user to select a range of cells of the matrix to be colored with the same chosen color; the user will then get to change the color of individual cells among such default-colored cells. Before enabling the user to submit the color pattern for the completed matrix for passcode generation, the registration sub-process verifies 130 that the color pattern entered by the user meets the minimum complexity requirements, and after such verification, prompts the user to memorize the color pattern submitted. The registration sub-process stores 140 the submitted color pattern, as a vector of digits, with each digit in the vector representing the color in the user's color pattern for its corresponding cell in the matrix, and associates that digital vector representation of the user's color pattern with the user's ID. As mentioned in the opening paragraph of this Detailed Description, in security-hardened embodiments, an encrypted and/or hashed version of the digital vector representation of the user's color matrix, rather than the plain digital vector of the color choices for matrix cells, gets stored 140 in the database 270 of passcodes for the registered UIDs. Such principle applies throughout this description, though for the sake of better comprehensibility of the operation of the graphical passcode-based authentication, the passcodes may be discussed as vectors of digits corresponding to the given user's color choices for the matrix cells.

The digital vector representation, in turn, can be understood as a number with radix K for K colors available for each cell in the matrix. An N-by-N matrix to be colored, with K colors available for each cell, provides thus $(N^2)^K$ unique coloring patterns for the matrix. For instance, if there are sixteen (16) available colors (coded to base-16 numbers e.g. as pink=0, red=1, orange=2, yellow=3, lime=4, green=5, turquoise=6, blue=7, violet=8, copper=9, gold=A, beige=B, brown=C, black=D, gray=E, white=F), e.g., a 11-by-11 matrix provides $16^{(11^2)}$, i.e., more than $10^{145}$ color pattern alternatives, with passcode entropy of $=(11^2)*\log 2(16)=484$ bits. The entropy here reflects the number of systematic guesses needed before surely getting the user's color pattern, and assuming users' color patterns are not predictable, that would be equal to the number of bits in the appended binary vector representation of the color pattern, which in this example, has $11^2=121$ hexadecimal (4 bit) digits, i.e., $121*4=484$ bits. At the time of preparing this specification, passcodes with entropy of 128 bits or greater were considered very strong; each additional bit of the entropy count doubles the search space for possible passwords.

Figure 3:
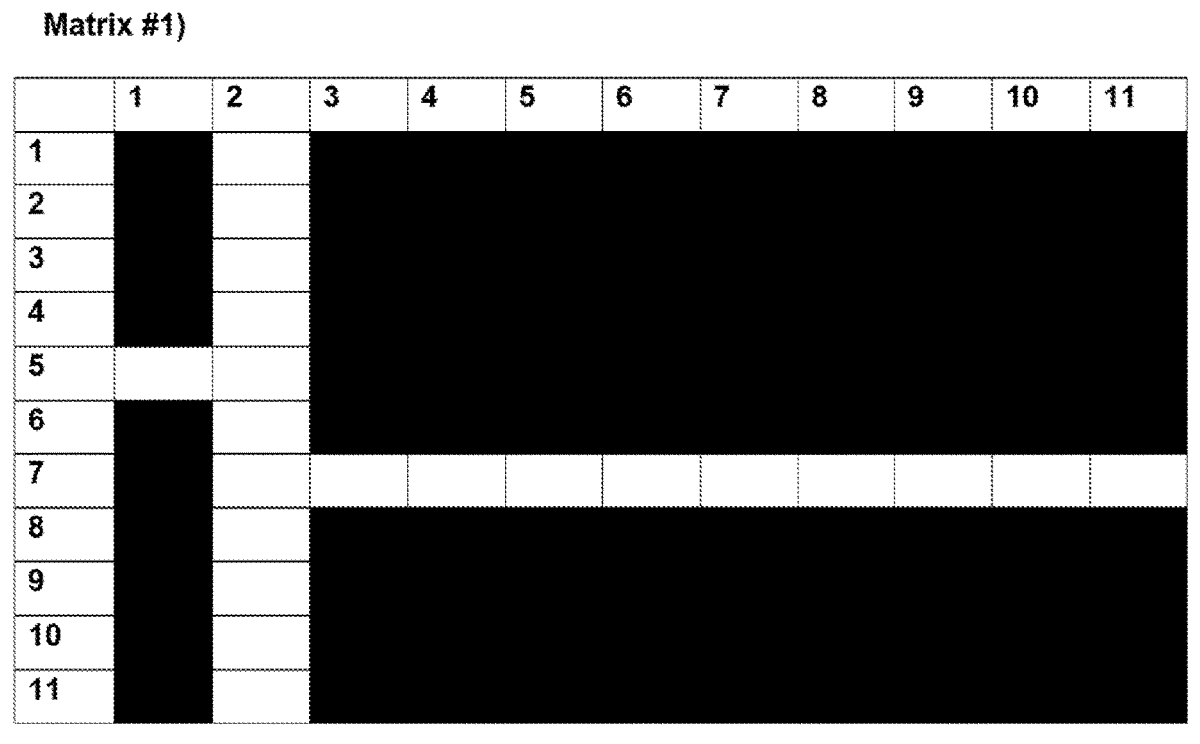

As an example, if the user used just black and white of the available cell color options, a possible (memorable) color pattern for the user's matrix could be, e.g., as illustrated in FIG. 3.

For further range of the user's color pattern, the system can instruct the user to provide, e.g., a 4-matrix series of color patterns; a memorable series, starting from the above matrix #1 of FIG. 3, could continue, e.g., per matrices #2, #3 and #4 of FIGS. 4A, 4B and 4C.

For the 4-matrix sequence example of FIGS. 3 and 4A-C, where the color matrix of FIG. 3 is referred to as Matrix #1 and the three successive matrices of FIGS. 4A-C as Matrices

2, #3 and #4, the user needs to memorize the matrix #1, and that its (white) bar elements will move in the following diagrams, as follows:

Matrix #1: Black background, white bar on $2^{nd}$ column, connected to left edge by a bar on row above, and to the right edge, by a row below, the center row.

Matrices #2-4: The column bar moves to right, at accelerating pace of 2, 4 ( ) steps, the bar to left edge widens downward at one step per stage, the bar to right edge rises one step per stage; if/once any of the bars cross any of the edges, the matrix grays out, with the center cell black. The gray cells are marked with letter "G" in the matrix 4.

The above example authentication pattern with color matrices is feasible for the user to memorize (it has a logical progression), but it still is semi-random and not guessable, for instance along the following degrees:

The choices of the number (e.g. 3) and selection (e.g. which 3 of the 16) of colors is not predictable (though it is memorizable for the user);

The initial pattern is abstract and asymmetric and thus not guessable (though it is memorizable);

The movements of the objects are optional, multi-directional and non-systematic, non-linear and non-monotonous, and thus unpredictable overall (though still memorizable);

The changes between the stages in the series are not linear, and thus not guessable (though the sequence follows a non-linear logic designed by the user and thus is memorizable to the user).

Thus, if the user's color matrix sequences are considered semi-random, the passcode entropy of a 4-stage series of 11-by-11 matrices of 16 colors is $4*(11^2)*\log 2(16)$ =1936 bits.

Some implementations can be configured to prompt the user to create a relatively long sequence of authentication color matrices, of which the user, when logging in, however needs to enter (or identify) potentially only a sub-sequence if the system determines that the observed circumstances of the login attempt are in the expected range, and if the user enters (or selects) the correct color matrix for the requested stages in the user's authentication matrix sequence.

For clarity, the vector representation of a user's color matrix pattern (series) can be formed simply as a vector of digits that each reflect the color the user selected for the corresponding matrix cell. For instance, the $1^{st}$ row in the Matrix #1 (FIG. 3) would be represented as a vector of hexadecimal digits DFDDDDDDDDD (where a digit 'D' signals a black, and a digit 'F' a white, cell in that row, per the 16-color coding scheme per above). As further examples, the 6th row of the Matrix #2 (FIG. 4A) would be represented by the hex-digit vector FDFFFFFFFFF, while the last (11th) row of the final Matrix #4 (FIG. 4C) by the vector EEEEEEEEEEE. If the user had selected for instance red as the background for the Matrix #2, the vector representation of its 6th row would be 1D111111111, and so on. These digit vectors for the user's color matrix pattern (series) are concatenated from the first to last to form the completed vector representation for the user's graphically entered passcode. With eleven 11-element rows for a series of 4 matrices, the user's passcode vector would thus be a total of 11*11*4=484 hexadecimal characters (with each hexadecimal character requiring 4 bits), i.e., 1936 bits (or 242 bytes).

Note that, per this specification, the size of the user's graphic pattern based passcode thus is based on simply the number of bits in the hexadecimal digit vector representation of the graphic pattern, e.g., for the 11-by-11 color matrices per above, 484 bits per a matrix, which is much less than the size of typical graphic files that typically would consume at least several kilobits, i.e., at least in the order of 1000-times as much memory, storage and/or network transmission capacity, however without providing corresponding passcode entropy.

Figure 5:
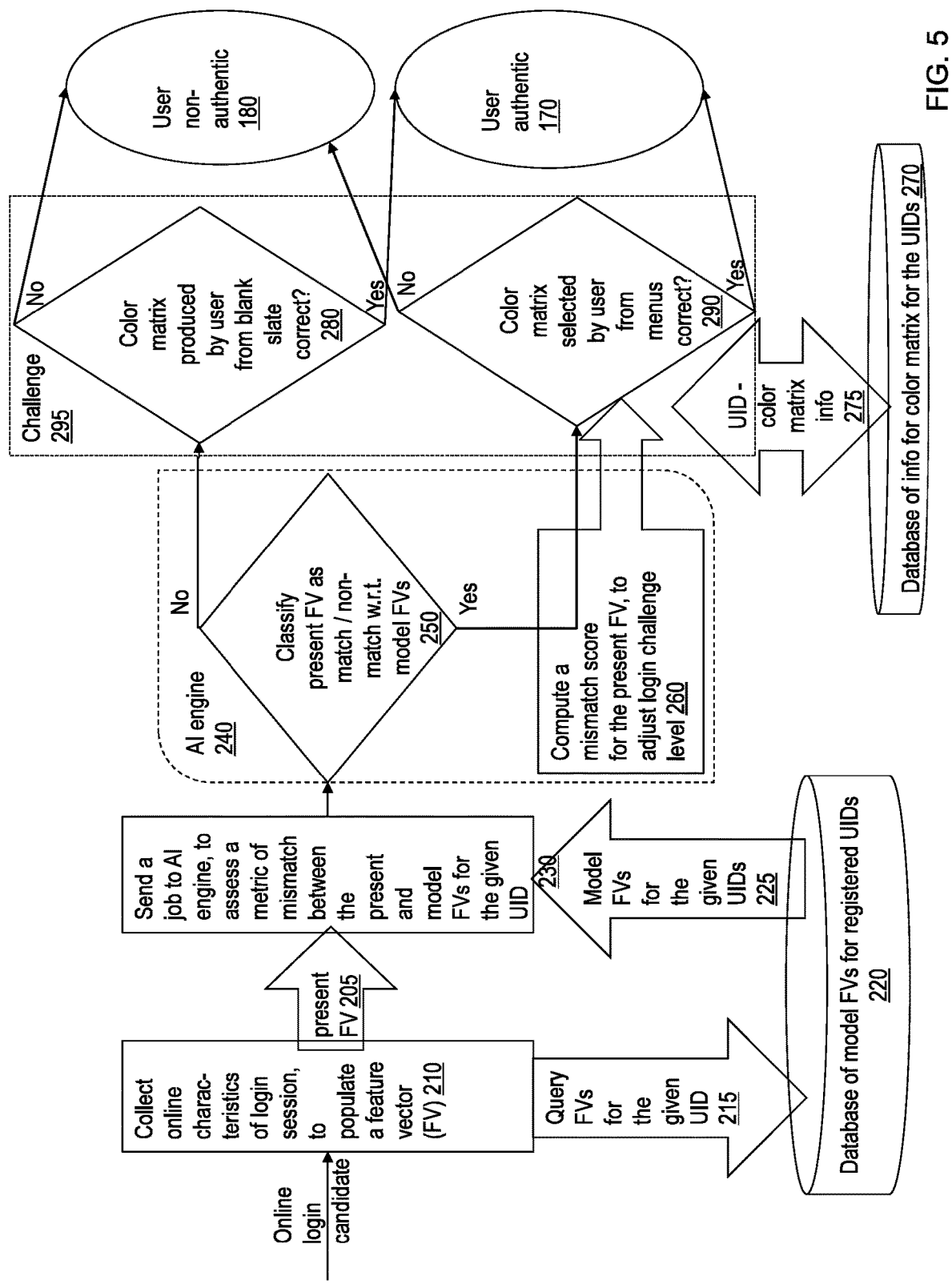
FIG. 5 illustrates a logic flow diagram of major steps for adjusting the level of authentication challenge based on a level of deviation between observed vs. expected values of a defined set of online behavior features of a login candidate, according to an example embodiment of the disclosed authentication system.

The procedures for resetting one's password with the herein described graphical password generation follow the herein described procedures for a new user registering one's graphic pattern-based password. Naturally, to initiate the graphic based passcode regeneration for a given user account, the user has to be fully authenticated 170 (FIG. 1) for the account. The prospect of cases of a valid user having to reset one's graphic pattern-based password without being able to login to one's account are effectively eliminated per the user-online-behavior based, authentication-challenge adjusting methods as described in the following, and as illustrated in FIG. 5. As such, there is no particular need for convenience or productivity for handling any unexpected cases where valid users would have to reset their passwords due to inability to produce their graphic pattern based passcodes, and accordingly, high security measures, even at expense of user convenience, can be justifiably implemented for any occurrences of an actual valid user having to reset one's graphic pattern-based password while being logged out from one's account. Such user authenticity validation measure can include, for instance, requiring the user to answer sufficiently correctly and timely questions concerning system-recorded past activity at one account, circumstances of the account and previous passcode creation etc., where the answers are not explicitly stored anywhere, but are derived by the authentication system based on account operating data existing in various logs etc.

(B) Authentication:

In a basic scenario, the authentication system, as illustrated in FIG. 1, requests a returning user (i.e., a user already registered per the previously described sub-process), once having verified 150 that the entered UID exists in the database 270, to provide one's registered UID, and, in response, the system prompts the user to produce the graphic pattern associated with that UID using a to-be-colored matrix, e.g., per the model of Table 1 (of appropriate dimensions), and requires 160 a match to treat the user as authenticated 170. If the color matrix pattern involves a series of a number (e.g., four, such as per FIGS. 3-4) matrices, then, in the basic scenario (e.g., the initial login by the user), a match is requested and required for each matrix stage in the series (each starting with the to-be-colored matrix). Note that according to at least some embodiments, the authentication system will have the user produce one's graphic pattern even if the user entered a non-registered UID, and in response to any invalid UID and graphic pattern entry, simply report that the entered UID and graphic pattern do not match any records.

At the authentication system logic operation level, whether a match exists (or a level of match that may exist, for scenarios discussed in the following) is determined by converting the graphic pattern produced by the user (in response to the system's request) into its corresponding digital vector representation, through converting the user's color choice for each given element in the graphic pattern to its corresponding digital code per the encoding table used (e.g., for hexadecimal codes: pink=0, red=1, orange=2, yellow=3, lime=4, green=5, turquoise=6, blue=7, violet=8, copper=9, gold=A, beige=B, brown=C, black=D, gray=E, white=F), and checking whether such element-specific color codes (e.g., hexadecimal numbers) resulting from the graphic pattern entered (or chosen) by authenticating user match the corresponding element-specific codes of the passcode stored by the authentication system for the provided UID. For clarity, assuming the graphic pattern (using a template of an 11-by-11 color matrix with 16-color encoding per above) stored for a UID firstname.lastname@domainname postfix had the 2nd element of the 4th row colored green, the corresponding 35th (3*11+2=35) hexadecimal digit in the expected correct passcode for that UID is 5. Conversely, if the 34th hexadecimal digit for that passcode was C, the expected correct color for the 1st element of the 4th row of the 11-by-11 matrix to be colored by the user being authenticated is brown.

In certain more advanced scenarios, in case the authentication method uses a series of color pattern matrices, if the system detects the user as a likely valid user (for instance, the observed online behavior characteristics of the login attempt are in the expected range, e.g., the user is on a known, expected login device and IP address for the UID, etc.), the system will allow the user to select which pre-colored matrix of a number (e.g., 16) of alternative matrices would best match the user's actual matrix for a given stage in the series, and after each successful selection, continue asking the user to select the best of the alternative pre-colored matrices for the other stages in the series; after an unsuccessful selection, the system will require the user to enter the exact matching color patterns for each matrix for that login attempt, with a limited number of attempts and/or time per a stage. Conversely, based on the user's correct entry or selection of a number of color matrices in the sequence deemed by the system sufficient for the detected circumstances of the login attempt, the system can skip requesting the user to enter or identify the remaining color matrices in the user's authentication matrix sequence.

In certain configurations, the authentication system forms a risk score regarding any given login attempt and determines the appropriate level of authentication challenges based on the risk score for the current login attempt. In some configurations, instead of a risk score, the authentication system maintains a validity or correctness score for the given login session such that reflects a level of match (rather than a mismatch) of the present online-session login activity of a login candidate with the historical login behavior characteristics of the authentic user for the given UID; however, these two forms of security-level scores are effectively inverses of each other, and other than accounting for the opposite semantics (i.e. high risk score corresponds to low validity/correctness score, and vice versa), such different forms of login activity security score can be used in a similar manner and for same purposes, e.g. as described herein using examples that use the risk score semantics. For instance, the risk score could be 0 for a login attempt that matches exactly the expected characteristics of the typical login behavior of the authentic user for the entered UID, while the risk score would increase based on any observed deviations from the expected characteristics of the login behavior; such a risk score could, by default, start from a mid-range for the possible values of that score, and be adjusted up or down based on how well the observed online behavior of the user matches the expectations for that UID. Factors of the user's online behavior impacting the risk score for the given login attempt can include, e.g., the levels of (mis)match between the login-candidate user's keystroke pacing pattern of typing the given UID and the stored model pattern (time gaps between the different keystrokes etc.) for that UID, as well as the observed login device, location, IP address, time of the login attempt, and present login-status for the entered UID, and the corresponding expected types and values (or ranges) for such online session characteristics stored in the authentication system for that UID, based on known valid login sessions.

Naturally, the better the match of the factors per above, the lower the relative risk score will be for that login attempt, and conversely, the greater the mismatch between such observed and the stored model characteristics of the login behavior for a given UID, the higher will be the relative risk score assessed to that login attempt by the authentication system. In certain configurations, the risk score of a given login attempt can be adjusted also while the login candidate is producing the authentication challenge (sign-on graphic pattern) elements requested by the authentication system—for instance, the risk score can be increased based on the user candidate taking longer to produce a required graphic pattern than what is the stored model value for such time period for the authentic user of the provided UID; on the other hand, in case the login candidate is able to produce the requested graphic pattern elements quickly, the risk score of the present login could be reduced.

The ways that the assessed risk score of the login attempt can be used to adjust the challenge level for the given login procedure can include, according to embodiments of the presented authentication system, for instance:

determining whether the user is required to produce, from scratch (e.g., empty, to-be-colored matrix), the full graphic pattern passcode for the provided UID, or is allowed to select, from a varying (decreasing, down to a defined minimum) amount of alternatives, the graphic pattern best matching the correct pattern stored for that UID (for descending level of risk score and authentication challenge), in cases when the user's graphic pattern based passcode involves a series of graphic patterns, varying the length of a sub-sequence of graphic patterns, from the stored full series of, e.g., ten of such patterns entered by the authentic user when registering or changing one's passcode, that the login-candidate user is requested to produce, either by entering them from scratch, or by selecting the best matching graphic pattern from a set of alternatives (e.g., with lesser number of patterns in the series required for a lower level of authentication challenge and lower risk score assessed for the present login attempt), as well as, varying the required level of match between user's selection of the graphic pattern (e.g., color matrix) and the actual graphic pattern registered for that UID, where applicable, for the present stage in the registered sequence of patterns (with greater accuracy of match required for a higher authentication challenge level and risk score).

What herein is referred to as the best matching matrix from the alternative color matrices displayed to the user (deemed a sufficiently low risk login candidate), in typical configurations, is any such alternative pattern that has least total variation from the applicable user's actual color matrix, with each cell of differing color cell counting as one unit of variation. In some configurations, such counts of variation are further weighted depending on the spectral distance between the color selections for a given cell in the user's actual color matrix and the given alternative color matrix, e.g., such that red and orange, as well as orange and yellow, are at distance of 1 from each other, while red and yellow at distance of 2. In such weighted variation assessment scenario, an alternative matrix mistaking two red cells in the user's actual matrix for yellow cells gets a variation count of 2+2=4, while another alternative matrix mistaking three red cells in the user's matrix for orange cells gets a variation count of 1+1+1=3, such that the latter alternative (if both were otherwise identical with the user's actual color matrix pattern) would be deemed the best match among these two alternatives. Further, in some configurations, the system will, at least when the login attempt circumstances are detected as sufficiently low risk, accept the user's selection of any of the provided alternative color matrices with a total variation count less than a defined threshold value from the user's actual color matrix pattern for that stage of the authentication. Note that usage of such variation counts relies on storing of the digital vector representations of the UID graphic patterns using reversible encryption instead of 1-way hashing.

The semi-randomization of the alternative patterns offered for user's selection can be done, e.g., so that the actual pattern will not stand out in contrast to the other alternatives, while the alternative patterns are not centered around the actual pattern either. For instance, the system can move significantly away from the user's actual patterns along two or more degrees to create a modified color matrix pattern, and create random modifications centered around such a significantly modified pattern, and do so for, e.g., two or three significantly modified patterns. Yet, approximately one half of the alternative patterns could be created by starting from a truly random initial color pattern, which however has a memorizable structure, and creating systematically and randomly altered versions of that truly random starting pattern.

The system's ability, in conditions detected as sufficiently safe, to allow the user to select its pattern(s) matching best its actual color matrix pattern(s) from a set of alternatives, along with the capability to use variable-length series of color matrices for authentication allows achieving both user-friendly, efficient and highly secure online user authentication process. Notably, the described capabilities to use sequences of graphic patterns for user authentication, as well as the capability to request the user to select best matching patterns from semi-randomized alternatives, provide protection against so-called "shoulder surfing," i.e., attempts by another human user to learn the first user's passcode generating graphic pattern; with the described techniques, the other user will not likely ever get to see and memorize the first user's full and exact graphic pattern (sequence) that would be needed to login from another device and/or under otherwise differing circumstances (e.g., differing key stroke pacing detected by the system when entering the UID, etc.).

According to at least certain embodiments, the authentication challenge level adjustment system operates with the following principles:

In response to defined, monitored characteristics of online behavior of the login candidate, e.g., the UID typing charactering pacing pattern, deemed to sufficiently match the recorded models for the entered UID, instead of requiring the user to create one's color matrix from a blank slate (which is the default operation in case of insufficient match), the logic of the system directs the user to select from an array of pre-colored matrices a sufficiently closely matching matrix to the actual color matrix for that UID. Further, certain embodiments, rather than classifying the login candidate's online characteristic (e.g., UID typing pattern) either as a match or non-match, in order to determine whether the candidate is allowed to select an appropriate matrix from arrays of alternatives instead of being required to fill out the color matrix from the blank slate, the logic of the system may compute a risk score representing a degree of mis-match between characteristics of the present login session and the recorded models for the given UID, and use such mismatch score to set the level of appropriate login challenge for the given candidate. Besides the behavior of, at values of the mismatch score exceeding a set threshold, directing the login candidate to produce the correct color matrix from a blank slate, at a lower scale of the mismatch score, various embodiments of the authentication method respond to an increased value of the score by adjusting the level of authentication challenge, e.g., as follows:

by increasing the number of pre-colored matrices in the arrays (menus) from which the login candidate is to select a sufficiently closely matching matrix;

by increasing the number of successive menus from which the candidate is to select a sufficiently closely matching matrix;

by reducing the amount of time in which a sufficiently closely matching matrix needs to be selected by the candidate, and/or by decreasing the # of matrices considered sufficiently close to the user's actual matrix.

Some embodiments may, after a user's successful entry and/or selection of color matrices corresponding to the UID and before logging in the user, additionally require the user to correctly answer an operational question to which the authentication system (e.g., through deriving it from the authentic user's online activity) as well as the valid user can readily produce the correct answer (in case of the human user, at least approximately), but which has not been stored anywhere and not sent over a public network. Examples of information that can be queried via such operational security questions include, for instance, approximate or average times, frequencies, or durations of past login/logout sessions/events, or the expected login session this time, etc. Additionally, or alternatively, the authentication system can query the user for information not available to parties without the authorizations tied to the present UID (when that user would be considered fully authenticated). The system may allow the user to select the best or any acceptable answer to such further authentication questions from a set of alternative answers or ranges, but give only a limited and short time to answer, in order to validate whether the user attempting to login is the real owner of the account for the provided UID.

According to certain embodiments and operating configurations for providing an adjustable level of authentication challenge, FIG. 5 illustrates a flow diagram of main procedures for adjusting the login challenge based on a measure of difference between observed and expected values of a defined set of online behavior features of a login candidate, according to an example embodiment of the disclosed authentication system.

In FIG. 5, for the logic of the authentication system a set of features are defined that are to be collected 210 for any login attempt to the domain protected by the authentication system. In various embodiments, such features to be collected for a given login session can include for instance online user characteristics such as the user device and operating system specifics, web browser make and version, network (e.g., Internet Protocol) addresses or other network communication attributes, browsing history (e.g., referrer site), UID typing (e.g., key stroke time intervals) and input device operating (e.g., movement, clicking, touch, swipe, drawing, tapping, gesturing) patterns of the given login candidate. The observed values of the defined set of features to be collected for any incoming login candidate, referred to herein as a user, will form the components of a characterizing feature vector 205 (FV) for the given user, noting that some of the FV components (e.g., UID typing pattern) can themselves be vectors of values (e.g., milliseconds between key-up events in the typing of the UID). The values of user FV components can, in embodiments using typical computer and web technologies, be obtained by functions and features of web browser (client) and/or server-side scripting languages, e.g., JavaScript and its variants and extensions (including, for example, Node.js), PHP Hypertext Preprocessor (PHP), etc., and their equals, successors and so forth.

Once the FV for the entered registered UID is thus populated 210, the authentication system will query 215 a database 220 for FVs of UIDs to obtain the FV information for the UID of the query. Assuming the UID is registered with the login system, the database 220 system responds with the FV information for the queried UID, along with, in at least some embodiments, corresponding FV information for representative other potential users, where such FV information for other users can be based on either FV component information of representative sets of anonymized real users, or be synthesized, e.g., via averaging, randomizing etc. the values of FV components of the registered and/or test users. The applicable design principle is that the FV information for the users other than the queried UID should, at least approximately, correspond to the FV of typical users, such that the FV 205 of an unauthentic login candidate will more likely resemble the FV information of at least some of the other users than the UID entered. In the embodiments described in the following in further detail, the FV information for the UID subject to the database query 215, as well as the corresponding FV information for the other (real and/or synthetic) users, that is returned 225 in response to the query include a defined number of individual FVs, e.g., twenty FVs most recently recorded for valid login sessions of the UID of the query and labeled as such (e.g., with an associated FV component, representing whether the given FV matches the provided UID, set to value '1'), along with similar or larger number of FVs corresponding to other users also labeled accordingly (e.g., with the FV component representing whether the given FV matches the provided UID set to a value '2' or greater, other than the value denoting a case of unlabeled FV). Naturally, in case the database system 220 did not contain an entry for the UID of the query 215, the response 225 will so indicate, in some embodiments to signal the login system to direct the user to either enter an actually registered UID or get registered with the UID. Moreover, in case the database contained less than the defined number of FV recordings for the entered UID, at least in some embodiments, the actually recorded FVs for the UID will be complemented by repeating such recorded FVs, starting from the most recent FV recordings, until the defined number of (e.g., twenty) model FVs for the UID is reached. Further, in such scenarios, certain embodiments, rather than repeating (a small number of) actual recorded FVs, will complement them by including in the number of model FVs for the queried UID slightly modified versions of the existing FV recordings, e.g., by incrementing or decrementing the individual FV components values of the individual FV recordings by random values that are small compared to the corresponding actual recorded values.

Assuming the database system 220 did return the given query 215 with a response 225 populated with FV information for the (registered) UID entered by the given user, the next step 230 in the authentication level adjustment process of FIG. 5 is to add to such response, including the respectively labeled collections of (a) the model FVs for the given user and (b) alternative FVs representing other (real or synthetic) users, the unlabeled FV 205 of the present login attempt, and send such batch of FVs to an artificial intelligence (AI) engine 240 as a classification (and potentially, risk scoring) job. To denote the present FV as unclassified, it can be labeled with a value reserved for that purpose, e.g. '255'. Note that, in case the database 220 did not yet contain the defined number of recorded FVs for the queried UID, various embodiments may use logic provided in functions related to sending 230 the job to AI engine 240, or at a pre-processing stage of the AI engine 240, rather than with the database 220, to complement the number of actually recorded FVs for the given UID to reach the defined number (e.g., twenty) of model FVs for the UID.

Among the batch of FVs sent 230 to the AI engine 240, the collection of the alternative FVs can in certain embodiments include a common collection of anonymized model FVs stored for UIDs other than the entered UID, FVs recorded for login attempts determined to be unauthentic for whatever UID (registered or not) entered, as well as FVs synthesized based on such FVs for unauthentic login candidates for the entered UID. In other embodiments, that collection of the alternative FVs representing login attempts that would be unauthentic for the entered UID will include defined (including accordingly labeled) subsets at least for the cases of FVs that are based on (i) model FVs stored for other UIDs, and (ii) FVs recorded for login attempts determined to be unauthentic (for whatever UID entered). As a general condition, to deem the present FV 205 as more likely a match with model FV(s) stored 220 for the presently entered UID than the alternative FVs, the logic 250 at the AI engine 240 should determine whether the present FV is closer to the model FVs for the entered UID than to the alternative FVs, including to any of the defined subsets among the alternative FVs, included in the batch job provided 230 to the AI engine 240. In the herein considered example embodiments, the logic 250 uses a measure of vector distance as a basis for assessing the relative closeness of the present FV with the model FVs for the entered UID as well as to the (subsets of the) alternative FVs. In at least some of such embodiments, such a vector distance measure is taken between the present FV and the average vector of the alternative FVs, and any defined subsets of the alternative FVs.

In certain embodiments, the determination 250 of whether the present FV sufficiently closely matches the model FVs for the entered UID is based on the vector distance between the present FV and the model FVs stored 220 for that UID, with, at least in some of such embodiments, the model FVs represented for such calculation as their average vector. In some of these embodiments, the present FV is classified 250 as a match if such a vector distance measure between the present FV and the model FVs of the UID is less than a set threshold, and otherwise as a non-match. In some embodiments, that vector distance measure is taken to represent a risk score for the likelihood that the present login attempt is unauthentic.

The embodiments of the AI engine 240 discussed herein in greater detail will, for a given incoming job 230, at its initial phase 250, classify the unlabeled FV 205 of the present login attempt as either a match or non-match compared with the model FVs for the present UID. Such classification, or scoring when a finer granularity is relevant, in some embodiments, can be done based on techniques per the related applications U.S. patent application Ser. No. 16/798,310, entitled "Online Trained Object Property Estimator", filed on Feb. 22, 2020 and U.S. patent application Ser. No. 16/812,158, entitled "ONLINE TRAINED OBJECT PROPERTY ESTIMATOR", filed on Mar. 6, 2020, where the batch of FVs in the given classification job operates as a (mini) stream, with the labeled match and non-match FVs functioning as training objects, based on which the unlabeled present FV 205 (the final object of such mini-stream) is labeled by the classifier 250.

In the case of non-match classification 250 for the FV 205 of the present login session, embodiments of the logic of the adjustable authentication challenge system described here in detail will direct the user to produce 280, from a blank slate, the graphic pattern, assumed here to be a color matrix, used to generate the passcode for the UID. Along that branch of the system operation, the challenge-stage 295 of the login system will test 280 whether the color matrix thus produced by the user, referred to as a trial matrix, matches what is registered 270 for the entered UID. In case yes, the user is considered authenticated 170, and otherwise not 180. Naturally, the logic for testing 280 whether the graphic pattern produced by the user matches what is expected for the entered UID will, in various embodiments, operate on various levels of representation of information for the color matrix. For example, in certain embodiments, the logic 280 will compare whether the respective outputs of a defined hash function for the registered and the trial color matrices are equal.

Though hash functions as such are not a topic of this disclosure, the hash functions for purposes of this description are any such hash function that, while not allowing to reproduce the input value from its output value, will produce any particular output value for a singular input value, with the values operated upon being integers in a defined range. That way, if the hashed values of, for instance, the respective hexadecimal vector representations of the cell colors of the registered and trial color matrices are equal, the test function 280 can conclude that the present user did produce the color matrix that was registered 270 for the entered UID, and can deem the user as authentic 170. Such an approach provides a security advantage via databasing 270 and returning 275 hashed information for the user's color matrices, instead of information that would as such correspond to the specifics (e.g., cell color choices) of the user's color matrices. The function of hashing of the passcode information for storing 270 at the server is to be done at the server side, to ensure that the challenge logic 295 (also executing at the server side), testing whether the passcode representation based on the trial matrix matches the corresponding representation of the matrix registered 270 for the entered UID, actually receives the passcode as produced by the proper client script for generating a passcode based on the user's color matrix entry, rather than a (stolen) copy of the hashed passcode stored 270 for the given UID. Note further that the client-side code, besides encrypting the graphic pattern based passcode for transmission to the authentication server, will, at least in certain embodiments, further perform a preliminary hashing of the passcode, to destroy information for the generating graphic pattern already from the input to the encryption function, thus providing protection against a possibility that the encrypted passcode could be decrypted, e.g., via an unauthorized party gaining access to the private key that the authentication server uses to decrypt the message from the client. In any case, the web login session, and all client-server communications, between the client scripts executing at the user device and the server storing authentication information 220, 270 for the UIDs, are to be appropriately protected against all forms of access by unauthorized parties, e.g., using asymmetric encryption of protocols such as HTTPS and/or a VPN, to ensure the server (storing information 220, 270) and the client (producing the color matrix entry based on user input, and the corresponding passcode) in fact are communicating directly and exclusively with each other. These principles generally apply to all forms of storing and exchanging of sensitive information between the client and the server in all scenarios of the login (including registration and all branches of the authentication) processes, according to embodiments of the graphical passcode generation and authentication methods described herein in detail.

Moreover, in at least some embodiments, the hash functions per the foregoing will take as the function input, rather than the plain hexadecimal representation of the given color matrix, a 'salted' version of that hexadecimal representation modified by defined information concerning the associated UID, e.g., through XOR function based on the binary values of the characters of the UID and binary values of the characters of hexadecimal codes of the color matrix cells, with for instance repeating the characters of the UID to cover the length of the matrix hexadecimal character vector. Using such salting techniques, even if color matrices registered for different UIDs were identical, their respective hashes will be different, given that the UIDs will be unique, and similarly, even if it was known that the registered 270 hashes for certain UIDs are the same, the color matrices required 295 for successful login would still be different, thanks to the salting of the hash inputs with the unique UIDs. Further, in at least some embodiments, before hashing the salted passcode, the character string used as the salt, e.g., the UID, is hashed by some further hash function to protect the salt needed for hashing the passcode.

In the case of match classification 250 for the present FV 205 with model FVs for the entered UID, as the next phase 260 for setting an appropriate level of login challenge, the AI engine 240 will compute a metric representing a level of deviation of the present FV 205 from what was expected for the entered UID based on the FVs recorded 220 for that UID, to be used as risk score for the present login session. In at least some embodiments, such pattern matching 250 and risk scoring 260 of the FV of the present login attempt can be done using techniques per the related applications U.S. patent application Ser. No. 16/798,310, entitled "Online Trained Object Property Estimator", filed on Feb. 22, 2020 and U.S. patent application Ser. No. 16/812,158, entitled "ONLINE TRAINED OBJECT PROPERTY ESTIMATOR", filed on Mar. 6, 2020, for instance, based on an absolute value of a vector difference between the present FV 205 and a model FV computed as an average of FVs recorded 220 for the given UID. Such a risk score thus assessed 260 by the AI engine 240 for the FV 205 of the ongoing login session will, in turn, according to herein described embodiments of the login system, be used to adjust the level of complexity presented for the user at the challenge-stage 295, e.g., using techniques listed in the foregoing, such as, varying the number of successive menus of pre-colored matrices from which the user has to select a sufficiently closely matching matrix to the actual color matrix registered 270 for the entered UID. In such embodiments, assuming each of the menus, from which the user (classified 250 as a match) is to select a pre-colored matrix sufficiently close to the actual matrix of the UID, contained a fixed number, such as sixteen, matrices, while the number of matrices deemed sufficiently closely matching per menu was set to two, the potential value range for the computed risk score could be divided into subranges that correspond to their respective numbers of consecutive matrix menus to be correctly answered by the user. For instance, if the potential range for the login attempt risk scores was from 0 through 1023, the login system could map the risk scores up to 255 to three of such menus, the scores from 256 to 511, to four, and the scores greater than 512, to five or such successive menus, respectively letting $(2/16)^3=0.2\%$, $(2/16)^4=0.02\%$ and $(2/16)^5=0.003\%$ of login attempts, whose FV information sufficiently matched the FV information registered for the entered UID, through simply by chance. If a given user (with FV 205 sufficiently matching FVs recorded 220 for the entered UID) selected, for each of the menus of alternative matrices thus presented as a login challenge, one of the matrices deemed as sufficiently close to the actual color matrix of the entered UID, the logic 290 of this branch of the challenge-stage system will consider the given user as authentic 170, and otherwise as unauthentic 180. In at least some embodiments, the feature of having the user answer a given menu of alternative pre-colored matrices for the user's selection is implemented by having the, e.g., sixteen, color matrices of each menu identified with serial numbers, e.g., from 0 to 15, such that the user is to type the serial number of the matrix being selected from the given menu; that way, the user's selection of a matrix from a given menu is better protected against shoulder surfing than, e.g., a mouse-based selection.

The production of the menus of alternative color matrices, from which the user is requested to provide an answer identifying a matrix sufficiently closely matching the actual color matrix of the UID, for the step 290 of FIG. 5 can be done, for example by applying the principles described in the foregoing, concerning semi-randomization of the alternative patterns offered for user's selection. In at least some embodiments, the code for producing the array of alternative pre-colored matrices for the menus will run partly on the server side, where the stored 270 information for registered color matrices for the UID resides, and partly on the client side, e.g., on the user's web browser. In embodiments considered here in greater detail, the non-hashed information at database 270 for producing variants of the color matrices for any given queried 275 UID is encrypted, such that with a protected key it can be decrypted when needed for a challenge-test 290 involving menus of alternative color matrices.

In such embodiments, the server-side database 270 will hold and in response to queries 275 return to the menu-based challenge-stage 290, for a given UID entry, information for the corresponding registered color matrix that the client side code for the login application is to process, along with certain randomized dynamic information produced 275 by the server code for the present login session, in order to produce a seed color matrix for the (first) menu of alternative color matrices to be presented for the user. The mentioned dynamic information will cause the seed matrix produced by the client-side code to vary, even for the same UID, from one login session to another in a randomized manner.

Moreover, in some embodiments, the seed matrix per above will not be included among the (1st) menu of alternative matrices displayed to the user, but in place of it, a different matrix is included in the menu such that is varied in a different manner, even if for the same degree of differences, than the first mentioned seed matrix. In certain of such embodiments, to produce the mentioned different matrix, which will be (like the actually hidden seed matrix first mentioned would have been) among the displayed matrices of the menu the one closest to the actual color matrix registered 270 for entered UID, the server will include two, different pieces of dynamically generated information in returning 275 queries for information for the color matrix registered for the given UID; one piece of dynamic information for creating the hidden seed matrix, and another creating its variant that will be the closest matrix of the ($1^{st}$) menu compared to the actual matrix registered for the given UID. Alternatively, the mentioned second piece of dynamic information can be generated on the client side either randomly or based on the dynamic information included in the response 275. For secure system implementation, the logic for producing the menus of matrices, including for seed matrix hiding per above, is to be located on the server side, such that no information concerning correct matrix selection is provided to the client side. In addition, identity of the accepted matrix selections from each menu is to stay on the authentication server, with server-side logic determining whether the user's matrix selections for each given menu presented is accepted. These techniques, and variations thereof, can be used to prevent an unauthentic user, assuming such an attacker actually was able to produce through one's online session characteristics of a FV 205 that sufficiently matches what is expected for the entered UID, from deducing or determining which of the displayed alternative color matrices would be among the acceptable choices w.r.t. the actual color matrix registered 270 for the entered UID.

Moreover, in certain embodiments, the logic of the authentication system requires the user to produce the requested color matrix, including when selecting from a menu a color matrix sufficiently close to the one registered for the entered UID, within a set time limit, e.g., number of seconds adjusted (inversely) based on a metric of difference between the FV 205 of the present login session and the average of the model FVs recorded for the entered UID; without such a timely response, the login session times out the user. Further, various embodiments will accumulate various forms of scores for login attempts for any given entered UID that are not timely successfully completed, whatever the branch of the login process being followed (e.g., whether the authentication logic classified 250 the UID entry pattern as a match or non-match), and, in case such a score for unsuccessful login attempts would exceed a defined threshold (e.g., 3 consecutive login attempts without a timely success), restrict or block login attempts for that UID and freeze the associated user account, until a login candidate for the given UID would answer correctly further security challenges such as those required for a password reset, after which the system may require the user to change one's login graphic pattern in any case. Such techniques, and variations of them, can be used as further protection against attempts by unauthorized parties to deduce which of a menu of color matrices is closest to the one registered for the entered UID.

Further, in embodiments where a metric of difference for the user's selection of a color matrix is computed, e.g., to determine whether the matrix selected is sufficiently close to the correct matrix, or to keep an accumulated mismatch score for the login session, the logic of the authentication method will compare the matrix selected by the user with the actual matrix registered 270 for that UID, so that the closeness of the user's selection from a matrix menu is compared against the original matrix registered for the entered UID, rather than a variation from it (e.g., the above-mentioned seed matrix, or its displayed variant). The metric of difference per above, for the matrix selected by the user, can be computed by accumulating an incremental value for each cell of the selected matrix that has a color different than the corresponding cell of the matrix registered for the entered UID, and in some embodiments, such an incremental value per a differing cell can furthermore vary according to a measure of color spectral difference between the colors of the given cell in the selected and the registered matrices.

In such embodiments, as described in here in greater detail, at least some of the rest of the alternative color matrices for the given menu are based on semi-randomized matrix cell color (including matrix default color) variations from the first mentioned seed matrix, and any other alternative matrices can be randomized variations from an independently created secondary seed matrix, which would be typical among the matrices registered for the users. The subsequent menus of alternative color matrices are randomized reproductions of the initial menu that will, in case the user answered the preceding menu correctly, keep using the original seed matrix as the primary seed matrix, and otherwise, will use the user's matrix selection at the preceding menu as the primary seed matrix.

Notably, neither the information stored 270 at the server side for the given UID color matrix, nor the initial seed matrix constructed at the client side, correspond directly to the actual color matrix registered for the given UID. The same is generally true also for rest of the alternative color matrices of the menus that are randomized variations from the primary as well as any secondary seed matrices. Thus, the system avoids storing, exchanging or displaying information, even under encryption, from which the color matrix registered for any given UID could be derived. The menu based challenge logic 290, in some embodiments, will also place the matrices of each menu produced, including the seed matrix and the randomized variations based on it and any alternative seed matrices, in a randomized order on the matrix arrays of the menus, however noting the actual serial number of the seed matrix, and that of the set number of sufficiently close variations of it, to test 290 whether the user's answer to the given menu (typing of the serial number of the selected matrix) corresponded to one of the matrices deemed sufficiently close to the color matrix registered for the UID. Naturally, such a test 290 is meaningful just so long as the user has answered each of the preceding menus (if any so far presented) correctly; otherwise, i.e., following any wrongly answered menu, though the presentation of the menus of alternative matrices for the user will continue through the set number of menus for the login attempt, the user will be deemed unauthentic 180 regardless of the subsequent menu choices. However, in cases where the user does answer each of the set number of successive alternative matrix menus correctly, by typing the serial number of one of the sufficiently close variants of the initial seed matrix for each menu presented, the menu based challenge logic 290 will deemed authentic 170.

In certain system usage scenarios, the access controlled domain, protected using the authentication methods per this disclosure, will ascertain the true state of authenticity of the login candidates deemed as authentic 170 or unauthentic 180 by the procedures per the foregoing, and accordingly provide online training feedback to the AI engine 240, e.g., per feedback techniques taught in the related applications U.S. patent application Ser. No. 16/798,310, entitled "Online Trained Object Property Estimator", filed on Feb. 22, 2020 and U.S. patent application Ser. No. 16/812,158, entitled "ONLINE TRAINED OBJECT PROPERTY ESTIMATOR", filed on Mar. 6, 2020. Some usage scenarios will further utilize the charging and crediting mechanisms of the aforementioned related applications, based on correctness of the login candidate authenticity classifications 170, 180 compared with the ascertained authenticities of the login attempts.

In the operating scenarios discussed herein in greater detail, once the access-controlled domain has ascertained a given login attempt, classified as authentic 170, to truly be authentic, it will signal the authentication system per FIG. 5 to store 220 the FV of that attempt among the active model FVs for the associated UID. In case the database 220 already had the configured maximum number, e.g., twenty, of active model FVs stored for the given UID, this newly ascertained authentic FV is to replace the oldest of the existing model FVs. To support such operation, the system per FIG. 5 will keep, until a set limit of time and/or a set number of FV recordings, the FVs of login attempts deemed as authentic 170 as candidate FVs for their associated UIDs, and move such candidate FVs to actual model FVs stored 220 for their UIDs based upon receiving a confirmation of ascertained authenticity of the associated login session from the access controlled domain. Note that the above operation will function also for new users, such that even when there isn't yet a sufficient number of recorded 220 FVs based on with which to classify 250 the present FV 205 as a match, assuming the authentic user however is able to correctly reproduce 280 one's color matrix, the system will nevertheless deem the user as authentic 170, such that the access controlled domain will get to signal, assuming the user is ascertained to truly be authentic, the authentication system to store the associated FV as a model FV for the provided UID.

Moreover, in scenarios capable of ascertaining the actual authenticity of the login attempts deemed as unauthentic 180, the authentication system per FIG. 5 can be signaled to store the FV of such a login attempt deemed unauthentic, in case it was ascertained to truly be unauthentic, in a bank for model FVs for the non-match FVs, which are to be used for collection of non-match FVs in the jobs 230 sent to the AI engine 240. Further, in such cases, when a login attempt was deemed as unauthentic 180, but was ascertained to actually be authentic, the FV of also such a login attempt is to be signaled to be stored 220, by the authentication system per FIG. 5, as a model FV for the entered UID. Naturally, to support this operation, the system per FIG. 5 will temporarily store as candidate FVs for their associated entered UIDs also the FVs 205 for login attempts initially deemed as unauthentic 180, so that also such candidate FVs can be persistently stored as model FVs for their associated UIDs in database 220, to be used among the match-collection of FVs corresponding to the given UID in the jobs sent 230 to the AI engine 240.

Note further that, in some embodiments, the authentication system per FIG. 5 will, in case the FV 205 of a given login attempt was classified 250 to sufficiently match the expected models 220 for the entered UID, produce to the domain protected by this authentication system, as an alternative or in addition to the classification of a given login attempt as authentic 170 or unauthentic 180, the mismatch score value computed 260 for the present login attempt. In certain embodiments, that mismatch score could be, for example, an integer in the range [0, 100] representing the percentage likelihood that the present login candidate is unauthentic; e.g., a score value of thirty would signal that, among one hundred login attempts each having mismatch score of thirty, thirty can be expected to be unauthentic, and seventy authentic. In at least some of such embodiments, the mismatch score computed 260 based on the difference between the present 250 and recorded 220 FVs for the given UID, will be further adjusted based on the differences between the color matrices selected by 290 and registered for 270 the given user. Embodiments providing that type of a mismatch score (per above, e.g., computed 260 for login attempts sufficiently matching 250 the models registered 220 for the entered UID, and potentially adjusted through comparing 290 the user's color matrix selections with the correct ones), along with or in place of the authenticity classification 170, 180, to the domain protected by the authentication mechanisms per this disclosure, can use the value of such a mismatch score to adjust a level of further authorization challenges made for a given user within that domain, to control a level of resource access etc. rights granted to that user. For instance, before allowing a user, classified as likely authentic 170, e.g., to edit data records at the domain, the further challenge logic within the domain may, depending on the mismatch score, require the user to answer sufficiently correctly and quickly operational security questions which an unauthentic user would not readily know the answers to. In such operating scenarios, even if a given login attempt is deemed more likely authentic 170 than unauthentic 180, the higher the mismatch score computed for a given login attempt is, the higher the appropriate number of the further challenge questions, the difficulty level of the additional challenge tests, and/or the lesser the tolerated level of inaccuracy or time permitted for the answers thereof, should be, before authorizing the given user to access resources at the domain protected per the disclosed authentication methods. In addition, in at least some operating scenarios, the appropriate degree of further challenges presented for the deemed authentic 170 user will furthermore depend on the sensitivity of information the given user seeks to access, the risk potential of the action the user seeks to conduct, etc., and/or on the observed ongoing online (including, intranet) behavior of the given user, as well as the overall security threat level assessed for the given domain.

Along with the FVs, information for the alternative color matrices and a hashed passcode for authenticating login candidates, certain embodiments of the access control systems per this disclosure will store, among user-provided answers for regular security questions, also system-generated answers for extra security questions, for which there is a large answer space (e.g., "What year at least 3587 years to the past or in to the future would you like to visit?", etc.), in a manner that the actual users will not have access to these system-generated answers.

In such embodiments, a login candidate that answers such extra questions correctly can be detected, and de-authorized, as a likely attacker that apparently has broken into the system records holding information for the user's access credentials, and along with them, the answers to the extra questions which are system-generated and not knowable to the authentic user. Conversely, a candidate timing out, answering incorrectly or otherwise indicating not having the system-generated answers to such extra questions are to be deemed unauthentic.

In certain operating scenarios, the extra security questions are to be presented to a login candidate, or a logged-in user, when, while there has been a notable deviation in the observed activity of such a user from the recorded or expected patterns for the given username, the user however has been able to produce the correct responses for the other applied authentication challenges.

In addition or alternatively, the extra security questions (potentially among the regular security questions) can be presented to a login candidate, whose pre-authentication-challenge observed online characteristics mismatch, or match abnormally accurately, the corresponding recorded or expected values for the provided username, before the conclusively authentication test, to prevent login success for an attacker, detected as such by responding to the extra security questions correctly, or without observed sign of hesitation.

The extra security questions, and their system-generated answers, to be stored for a given username can be chosen from the same array or range as the regular security questions and their user-provided answers, and both of these types of security question-answer pairs (Q&As) can be stored for a given username in the same space so that a party other than the authentic user would not be able to tell whether the stored answer for a given security question is user-provided or system-generated. For example, per a username five security Q&As could be stored, of which between one to three are system-answered, with such extra security questions placed in random positions among the five security Q&As stored for a given username; in such a case, a login candidate answering more than four of the presented Q&As without hesitation would be detected as an apparent attacker.

Moreover, the system may store user information such as answers to personal security questions as slightly modified from the value actually provided by the user. The system logic is configured to accept login candidate's answers to such security questions with a defined error range from the stored (slightly altered) value, but not the actually stored value; in such a case, a candidate providing the stored, altered answer is detected as a likely attacker.

Furthermore, in certain configurations, the above extra and/or personal security questions are to be presented, e.g., when the accumulated risk score (measuring deviation of observed login session attributes from the model values stored for the given username) is 0 or other such a value that is atypical with authentic login candidates.

A possible, basic mode of using an embodiment of herein described graphic pattern-based passcode generation and authentication methods is as follows: a client program on a mobile device or personal computer generates a high-strength digital passcode (e.g., 11*11=121-character hexadecimal number, for an 11-by-11 matrix colored by the user) for an anonymous user based on the user's edition (later on, potentially, selection) of a graphic pattern memorizable to that anonymous user, which the user can copy-paste (the actual passcode being encrypted in transit) to the regular login prompt requiring a complex text-based password, along with the UID (which was not known to the application program generating the passcode based on graphic pattern editing of the user staying anonymous to that program/service). Here, the text-based password to be entered on the login prompt is to be understood as a string of hexadecimal digits, which each convert to a 4-bit binary code, e.g. a substring of 1A (for a pair of matrix cells colored red and gold, using the mentioned 16-color encoding scheme) would correspond to bit vector sequence of 0001_1010.

More advanced login prompts, requiring longer passcodes (e.g., 121*5=605 hexadecimal characters, based on a user's selection of series of four 11-by-11 color matrices), may provide higher level of integration and automation such that the user gets to produce its graphic pattern based passcode while seemingly staying with the regular login page of the user account protected by an embodiment of the herein described access control method enforcing and facilitating strong-password usage (entropy level of 5*11*11*log 2(16) =2420 bits based on a series of five 11-by-11 16-color matrices).

For a straightforward interoperability with conventional login prompts expecting a password of e.g. between 8 to 128 ASCII characters, the graphic pattern (e.g. color matrix)

based passcode generation per this description can include steps to produce, from the hexadecimal character string reflecting the user's color choices for the matrix cells as well as e.g. UID and/or other user-specific data (for instance, the password-generator system internal user serial number), an ASCII character based hash code of defined length, using a one-way hashing function (e.g., Secure Hash Algorithm (SHA-x)) that produces a fixed-length (e.g. 256 byte) hash code from a given source string. The hash code production can further be set up such that the fixed-length hash code will include at least a desired minimum number of non-alphanumeric ASCII characters (e.g., !, @, #, $ etc.). Moreover, in usage scenarios allowing to copy-paste the password to the conventional login screen, the graphic pattern based passcode generation method per this description can allow the user to copy-paste the generated, hashed passcode from the passcode generation application/applet (e.g., a pop-up window) to the password field of the conventional login page, and if supported by the conventional login prompt, such that the hashed passcode stays masked (displayed, e.g., as a string of black balls on password fields) from the user, as well as from any other potential viewers. Further, when the graphic pattern based passcode generation executes locally at the user device, e.g. on the user's web browser (for example using JavaScript or similar techniques), the users' password, in any form, either as a graphic pattern, its hexadecimal character vector representation or as the resulting fixed-length hash, will not be stored or transmitted anywhere such that it could be intercepted by an unauthorized party. Accordingly, using embodiments of systems and methods per this description, the user can conveniently produce a strong-security (cryptic, non-dictionary-word based) passcode that will directly work for conventional login prompts expecting passwords including e.g. 8 to 128 ASCII characters, such that the user will not need to remember, and in fact, will not necessarily ever see or even know what the password is, as well as that, in all its forms, from the source graphic pattern to the hash code ASCII password—including before transmission as encrypted along with the login user name (and other user login information) for the given strong-password protected domain—stays inaccessible to any unauthorized actors.

Moreover, in at least certain embodiments per FIG. 5 and related descriptions, the password text field of conventional login screens is made unnecessary, and eliminated, by the described graphic pattern based password generation and authentication mechanisms, which, instead of requiring the login candidate (a user) to enter a traditional password string, request the user to reproduce the graphic pattern registered for the entered UID, which the logic of the password generation and authentication system will automatically convert to a salted, hashed passcode, and compare that with the salted hash of the passcode stored for the given UID, to determine whether the user is authentic. Moreover, as further described in reference to FIG. 5, in cases where the observed characteristics of the present login session sufficiently match what is expected for the entered UID, the user is allowed to select one's graphic pattern from arrays of displayed alternatives, and the system logic will determine whether the patterns selected by the user are sufficiently close to the graphic pattern registered for the entered UID, and if so, the system will consider the user as authentic, and otherwise unauthentic. Further, in such scenarios, in addition to the classification of the given login attempt as likely authentic or unauthentic, embodiments of the authentication system as disclosed can produce a mismatch score accumulated for the present login session, based on differences of the user login session variables and the corresponding recorded values for the given UID, in order for the domain protected by the authentication system to accordingly present potential further authorization challenges to the user (e.g., query specifics pertaining to the authentic user's activity within that domain), to determine appropriate authorization levels (if any) for the user.

Even if not explicitly mentioned in this description, in at least some embodiments, sensitive user information such as the user's password is asymmetrically encrypted for transmission between the client code (executing the graphical passcode generation applet at the user device) and the server code (executing the authentication logic), as well as is one-way hashed for storage at the server. The asymmetric encryption mechanism, e.g., PKI, is to ensure that the parties exchanging sensitive data can verify that they are communicating directly and exclusively with the intended, authentic counterparty. One-way hashing of the password information for storing at the authentication server is to eliminate any possibility for access to the original password from the stored information due to the one-way nature of the hash functions, such that information for the original password, or for the graphic pattern that would generate it, cannot be derived from the stored, hashed information. Moreover, unique information, called salt, is added to the original passcode for each user account before the hashing, to ensure the passcode hashes will be unique also for user accounts having the same passcode. The hashing of any given user's passcode is done by logic at the server side to ensure that the authentication logic (i.e., testing whether the hash of the passcode of a given login attempt matches the stored passcode hash for the given user account) receives for the given login attempt the (encrypted) passcode in the form it should be before the hash function applied for the passcode as stored at the server, rather than a copy of the stored hash of the passcode. Further, the encryption ensures that such a passcode received by the server-side authentication code for the given login attempt was actually generated by the unmodified client script for the graphical passcode generation that was sent to the user's browser from the authentication server. Collectively, these encryption and hashing techniques will thus enforce, as a condition for a successful login to a given user account, demonstration of knowledge of the original graphic pattern generating the passcode for the given user account, which graphic pattern, through the disclosed techniques, can be kept as a secret that is memorizable, and safely and conveniently reproduceable, just by the authentic user.

Generally, this description and drawings are included to illustrate architecture and operation of practical embodiments of the present disclosure, but are not meant to limit the scope of the claimed invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the innovations described herein.

Moreover, the system elements and process steps, though shown as distinct to clarify the illustration and the description, can in various embodiments be merged or combined with other elements, or further subdivided and rearranged, etc., without departing from the scope of the disclosure. Generally, persons of skill in the art will realize that various inventive embodiments of the present disclosure can use different nomenclature and terminology to describe the system elements, process phases, technical concepts, etc., in their respective implementations.

For instance, it will be readily understood that, while in the foregoing the graphic patterns are described as color-coded matrices, the selection of colors for the matrix cells can be substituted with alternatives such as selection of different symbols, pictures, shapes etc. for the matrix elements. Likewise, what is in the foregoing described as 2-dimensional matrix, can be substituted by alternative arrangements for visualization of the user-entered (and system-generated, semi-random alternative) graphic patterns. For example, the user's editing of the shapes of the individual graphic patterns, in place or in addition to editing their contents, in a sequence of such patterns can be used to form the user-entered graphic pattern used to authenticate the given user.

Accordingly, from this description many variants will be understood by one skilled in the art that are yet encompassed by the scope of the teachings as set forth herein.

What is claimed is:

1. An authenticating system comprising:
   a user interface for
      (i) presenting, for a login candidate, a set of one or more authentication screens of a variable challenge level, at least one of the set of one or more authentication screens being configured to prompt the login candidate to produce a graphic pattern of a given user of a plurality of registered users, wherein the login candidate is identifying as the given user, and
      (ii) observing characteristics of the login candidate;
   a server storing respective model characteristics for each of the plurality of registered users; and
   hardware and/or software logic configured to execute a process comprising
      based at least in part on a comparison of the observed characteristics of the login candidate with the respective model characteristics stored for the given user, forming an assessment of risk that the login candidate is unauthentic, and
      adjusting the variable challenge level according to the assessment of risk, through
         a) directing the login candidate to one of a set of at least two authentication subprocesses, wherein
            in a first subprocess of the at least two authentication subprocesses corresponding to a higher value of the assessment of risk that the login candidate is unauthentic, the login candidate is required to produce the graphic pattern registered for the given user from a set of basic elements, and
            in a second subprocess of the at least two authentication subprocesses corresponding to a lower value of the assessment of risk, the login candidate is required to produce the graphic pattern by selecting, from an array of alternative graphic patterns that excludes the graphic pattern registered for the given user, a pattern that is within a threshold difference of matching the graphic pattern registered for the given user, and/or
         b) over at least a certain range of values of the assessment of risk, for elevating values of the assessment of risk,
            increasing complexity for each screen of the set of one or more authentication screens presented to the login candidate,
            increasing a number of successive challenge screens of the set of one or more authentication screens presented to the login candidate, or
            reducing time given to the login candidate to respond to each screen of the set of one or more authentication screens.

2. The authenticating system of claim 1, wherein directing the login candidate to the first subprocess comprises:
   generating, for presentation as a screen of the set of one or more authentication screens, a passcode creation user interface comprising an array of user-selectable graphic elements; and
   receiving, via the passcode creation user interface, a pattern of user selections for the user-selectable graphic elements of the array, the pattern of user selections comprising, for each element of at least a portion of the user-selectable graphic elements, a respective fill option of a plurality of fill options selected by the given user for filling a respective element.

3. The authenticating system of claim 1, wherein directing the login candidate to the second subprocess comprises:
   generating, for presentation as a screen of the set of one or more authentication screens, a passcode selection user interface comprising the array of alternative graphic patterns;
   receiving, via the passcode selection user interface, selection of one of the alternative graphic patterns; and
   generating, for presentation as a next screen of the set of one or more authentication screens, the passcode selection user interface comprising a second array of alternative graphic patterns different than the array of alternative graphic patterns, wherein a number of screens of the set of one or more authentication screens is determined in part based upon the assessment of risk.

4. The authenticating system of claim 1, wherein:
   adjusting the variable challenge level comprises adjusting a level of match considered as being within the threshold difference of matching the graphic pattern registered for the given user; and
   the second subprocess further comprises
      receiving selection of a selected graphic pattern of the array of alternative graphic patterns, and
      determining whether the selected graphic pattern is within the threshold difference of matching the graphic pattern of the given user, wherein
         the level of match is applied in the determining.

5. The authenticating system of claim 1, wherein the characteristics of the login candidate comprise at least one of characteristics of typing of a user identifier of the given user at a keyboard, or characteristics of usage of another input device beyond the keyboard by the login candidate for interacting with the user interface.

6. The authenticating system of claim 1, wherein the graphic pattern is a graphic pattern series comprising two or more graphic pattern segments.

7. The authenticating system of claim 6, wherein increasing the number of successive challenge screens comprises increasing a number of segments of the two or more graphic pattern segments that the login candidate is required to produce in either the first subprocess or the second subprocess.

8. A method comprising:
presenting, to a login candidate via a browser interface at a display of a computing device, a request for identification as one of a plurality of registered users;
obtaining, through the browser interface by processing circuitry comprising hardware logic and/or software logic, characteristics of the login candidate comprising characteristics of interactions with a user interface and/or observed hardware, software, network or login activity characteristics of the login candidate, wherein the login candidate, responsive to the request for identification, identified as a given user of the plurality of registered users;
comparing, by the processing circuitry, the characteristics of the login candidate with model characteristics corresponding to the given user;
based on the comparing, forming a risk assessment representing predicted authenticity of the login candidate; and
presenting, to the login candidate via the browser interface, a login challenge user interface prompting the login candidate to produce a graphic pattern of the given user, wherein
a challenge level of the login challenge user interface is set according to the risk assessment,
wherein
for a higher challenge level, the login challenge user interface presents, to the login candidate via the browser interface, a set of basic editing constructs for reproducing the graphic pattern of the given user, and
for a lower challenge level, the login challenge user interface presents, to the login candidate via the browser interface, a collection of alternative graphic patterns that excludes the graphic pattern of the given user, wherein the login candidate is prompted to select, from the collection of alternative graphic patterns, a pattern that is within a threshold difference of matching the graphic pattern of the given user.

9. The method of claim 8, further comprising:
receiving, responsive to user interaction with the login challenge user interface, response data corresponding to a candidate graphic pattern; and
determining, by the processing circuitry, whether the response data is within the threshold difference of matching the graphic pattern registered for the given user.

10. The method of claim 9, wherein determining whether the response data is within the threshold difference of matching comprises:
transforming the candidate graphic pattern into a candidate digital vector; and
comparing the candidate digital vector to a registered digital vector stored as a representation of the graphic pattern registered for the given user.

11. The method of claim 8, wherein the set of basic editing constructs comprises at least one of
a set of graphic pattern element shapes, wherein a plurality of graphic pattern elements each having a same shape is arranged into a graphic pattern matrix,
a set of matrix shape options for arranging the plurality of graphic pattern elements into a selected matrix shape of the set of matrix shape options, or
a user-adjustable matrix orientation for orienting the graphic pattern matrix.

12. The method of claim 8, wherein setting the challenge level comprises, over at least a certain range of values of the risk assessment, for elevating values of the risk assessment,
increasing complexity for each screen of a set of one or more authentication screens presented to the login candidate,
increasing a number of successive challenge screens of the set of one or more authentication screens presented to the login candidate, or
reducing time given to the login candidate to respond to each screen of the set of one or more authentication screens.

* * * * *